(12) United States Patent
Parachini et al.

(10) Patent No.: US 12,017,842 B2
(45) Date of Patent: Jun. 25, 2024

(54) HEAT SEALING APPARATUS

(71) Applicant: Fresh Express Incorporated, Windermere, FL (US)

(72) Inventors: Michael J. Parachini, Salinas, CA (US); Sesar Santiago Jauregui, Salinas, CA (US); Frederick Forgnone, Lockwood, CA (US)

(73) Assignee: Fresh Express Incorporated, Windermere, FL (US)

( * ) Notice: Subject to any disclaimer, the term of this patent is extended or adjusted under 35 U.S.C. 154(b) by 0 days.

(21) Appl. No.: 17/865,990

(22) Filed: Jul. 15, 2022

(65) Prior Publication Data

US 2023/0002147 A1 Jan. 5, 2023

Related U.S. Application Data

(63) Continuation-in-part of application No. 17/020,688, filed on Sep. 14, 2020, now Pat. No. 11,518,113.

(60) Provisional application No. 62/900,269, filed on Sep. 13, 2019.

(51) Int. Cl.
| | |
|---|---|
| *B65D 85/30* | (2006.01) |
| *B29C 65/00* | (2006.01) |
| *B29C 65/18* | (2006.01) |
| *B65B 11/58* | (2006.01) |
| *B65B 51/04* | (2006.01) |

(52) U.S. Cl.
CPC .............. *B65D 85/30* (2013.01); *B65B 51/04* (2013.01); *B29C 65/18* (2013.01); *B29C 66/1122* (2013.01); *B65B 11/585* (2013.01)

(58) Field of Classification Search
CPC ... B65B 11/585; B29C 66/1122; B29C 66/81; B29C 65/18; B32B 37/0046; B32B 37/0076; B32B 38/18; B65D 2571/00012
See application file for complete search history.

(56) References Cited

U.S. PATENT DOCUMENTS

| | | | | |
|---|---|---|---|---|
| 3,853,218 A | * | 12/1974 | Grasvoll | B65B 9/026 53/442 |
| 3,999,357 A | * | 12/1976 | Marantz | B65B 11/585 53/442 |
| 5,623,808 A | * | 4/1997 | Franklin | B65B 35/50 53/399 |
| 6,775,956 B1 | * | 8/2004 | Lacey | B65B 11/585 53/399 |
| 9,205,964 B2 | * | 12/2015 | Wagner, Sr. | B65B 11/50 |
| 2010/0293893 A1 | * | 11/2010 | Macleod | B65B 9/135 53/469 |

(Continued)

*Primary Examiner* — Carson Gross

(74) *Attorney, Agent, or Firm* — Kilpatrick Townsend & Stockton LLP

(57) ABSTRACT

A heat seal between a plastic bag and a plastic sheet is used to provide a more secure and reliable seal to define a modified atmosphere for a pallet of perishables. The heat seal reduces atmosphere failures and aids in providing a more consistent atmosphere in the pallet bag system thus reducing the number of pallets that have an out of specification atmosphere. The heat seal may be created with a heating sealing apparatuses that is part of a system used to load and seal a load of containers of perishables onto a pallet. The heat sealing apparatus uses a plurality of heated bar assemblies to form seal portions on sides of the pallet in order to form a seal around the entire perimeter of the pallet.

15 Claims, 19 Drawing Sheets

(56) References Cited

U.S. PATENT DOCUMENTS

2020/0039669 A1* 2/2020 Basharanov ............ B65B 41/12

* cited by examiner

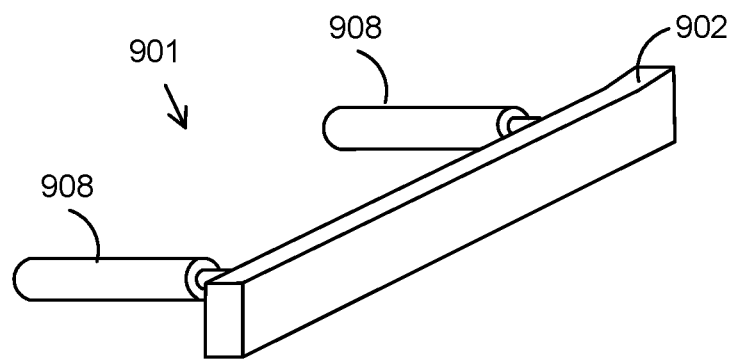
Fig. 10A
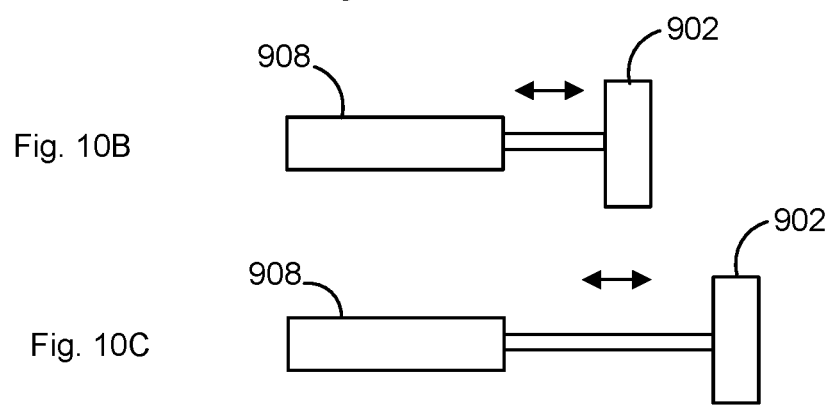
Fig. 10B
Fig. 10C
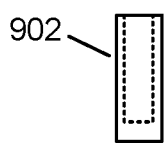 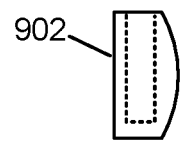 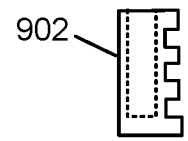
Fig. 11A  Fig. 11B  Fig. 11C

HEAT SEALING APPARATUS

CROSS-REFERENCES TO RELATED APPLICATIONS

This application is a continuation in part of U.S. patent application Ser. No. 17/020,688, filed on Sep. 14, 2020, which claims the benefit of U.S. Provisional Application No. 62/900,269, filed on Sep. 13, 2019, which are both incorporated by reference in their entirety herein.

FIELD

The present technology relates to sealing fresh perishables on a pallet within a modified atmosphere.

BACKGROUND

The fresh perishables trade uses modified atmosphere technologies on bagged, or otherwise enclosed, and sealed pallet unit quantities of perishables to preserve freshness and reduce market losses during distribution. Current systems use a plastic sheet located between the pallet and a stack of packages of perishables and a plastic bag positioned over the stacked packages of perishables. Tape is used to seal the plastic bag to the plastic sheet. Prior to or after tape sealing the plastic bag and plastic sheet, desired quantities of one or more gasses may be injected into the plastic bag, creating a modified atmosphere, which benefits the enclosed perishables. The tape seal may result in bunching of the plastic bag and/or plastic sheet at the tape seal which forms air channels from the modified atmosphere interior through the taped seal. The air channels allow the injected gas of the modified atmosphere to escape into the outside atmosphere and/or the outside atmosphere to seep into the bag at an undesirable and uncontrolled rate. Gas escaping or entering the enclosed bag in an uncontrolled manner is undesirable because it leads to loss of freshness or total loss of the perishables. The use of tape is additionally undesirable because it requires labor to apply and remove, and further results in additional wasted material used to seal the plastic bag to the plastic sheet.

Accordingly, there is a need to provide a more secure and reliable seal for the plastic bag and plastic sheet in order to provide a more consistent atmosphere in the pallet bag and reduce the number of pallets that have an out of specification atmosphere.

SUMMARY OF THE INVENTION

The present technology relates to providing a secure and reliable seal for a plastic bag used to define a modified atmosphere for a pallet of perishables. For example, the plastic bag may be a TransFRESH modified atmosphere package. The disclosed technology reduces atmosphere failures and aids in providing a more consistent atmosphere in the pallet bag system thus reducing the number of pallets that have an out of specification atmosphere.

According to an aspect of the present disclosure a method for sealing containers of perishables on a pallet between a plastic sheet and a plastic bag is described. The plastic bag is positioned over the containers and the plastic sheet is positioned between the containers and the pallet with margins of the plastic sheet folded to overlap margins of the plastic bag in an overlap area. The method involves applying one or more heated sealing heads to the overlap area in order to transfer heat to the plastic sheet and the plastic bag in the overlap area to weld the plastic sheet to the plastic bag around an entire perimeter of the pallet. The one or more heated sealing head includes a plurality of heated bar assemblies.

In many embodiments, each heated bar assembly includes a heated bar and one or more actuators. Accordingly, applying the one or more heated sealing head involves positioning, with the one or more actuators, each heated bar to be in contact with the overlap area in order to transfer heat to the plastic sheet and the plastic bag in the overlap area to weld the plastic sheet to the plastic bag around the entire perimeter of the pallet.

In many embodiments, the plurality of heated bar assemblies includes a first set of two heated bar assemblies and a second set of two heated bar assemblies. Accordingly, applying the one or more heated sealing heads comprises forming a left seal and a right seal by welding the plastic sheet to the plastic bag on left and right sides of the pallet with the first set of heated bar assemblies and forming a front seal and a rear seal by welding the plastic sheet to the plastic bag on front and rear sides of the pallet with the second set of heated bar assemblies in order to form a seal around the entire perimeter of the pallet. The first set of heated bar assemblies are positioned at a height above the second set of heated bar assemblies.

The method further involves transferring, via a conveyor, the pallet to a pallet receiving surface. The first set of heated bar assemblies is positioned above the conveyor and the second set of heated bar assemblies is located below the conveyor. The method can further involve raising or lowering, via a conveyor lift, the pallet between a raised position for using the first set of heated bar assemblies to form a seal and a lowered position for using the second set of heated bar assemblies to form a seal. For example, the conveyor lift includes a scissor lift.

In many embodiments, the heated bar includes a flat rectangular outer surface or a curved shaped outer surface that contacts the overlap area to weld the plastic bag to the plastic sheet. The heated bar includes a grooved outer surface that contacts the overlap area to weld the plastic bag to the plastic sheet. The grooved outer surface creates a plurality of seal bands.

According to another aspect of the present disclosure a sealing head for sealing containers of perishables on a pallet between a plastic sheet and a plastic bag is described. The sealing head includes a plurality of heated bar assemblies to transfer heat to the plastic sheet and the plastic bag in an overlap area to weld the plastic sheet to the plastic bag around an entire perimeter of a pallet. Each heated bar assembly comprises a heated bar and one or more actuators. The one or more actuators are configured to position each heated bar to be in contact with the overlap area.

In many embodiments, the plurality of heated bar assemblies includes a first set of two heated bar assemblies and a second set of two heated bar assemblies. The first set of heated bar assemblies are configured to form a left seal and a right seal by welding the plastic sheet to the plastic bag on left and right sides of the pallet around the entire perimeter of the pallet. The second set of heated bar assemblies are configured to a front seal and a rear seal by welding the plastic sheet to the plastic bag on front and rear sides of the pallet around the entire perimeter of the pallet.

In many embodiments, the first set of heated bar assemblies are positioned at a height above the second set of heated bar assemblies. The first set of heated bar assemblies is positioned above a conveyor and the second set of heated bar assemblies is located below the conveyor. In some embodiments, the heated bar includes a flat rectangular outer surface, a curved shaped outer surface, or a grooved outer surface that contacts the overlap area to weld the plastic bag to the plastic sheet.

According to another aspect of the present disclosure a heat sealing system for sealing containers of perishables on a pallet between a plastic sheet and a plastic bag. The plastic bag is positioned over the containers, and the plastic sheet is positioned between the containers and the pallet with margins of the plastic sheet folded to overlap margins of the plastic bag in an overlap area. The system includes a conveyor system for transferring the pallet to a pallet receiving surface, a conveyor lift for raising and lowering the pallet between a raised position and a lowered position, and a plurality of heated bar assemblies to transfer heat to the plastic sheet and the plastic bag in the overlap area to weld the plastic sheet to the plastic bag around an entire perimeter of a pallet. Each heated bar assembly includes a heated bar and one or more actuators. The one or more actuators are configured to position each heated bar to be in contact with the overlap area to weld the plastic sheet to the plastic bag around the entire perimeter of a pallet.

In many embodiments, the plurality of heated bar assemblies comprise a first set of two heated bar assemblies and a second set of two heated bar assemblies. Accordingly, applying the one or more heated sealing heads comprises forming a left seal and a right seal by welding the plastic sheet to the plastic bag on left and right sides of the pallet with the first set of heated bar assemblies and forming a front seal and a rear seal by welding the plastic sheet to the plastic bag on front and rear sides of the pallet with the second set of heated bar assemblies in order to form a seal around the entire perimeter of the pallet.

In many embodiments, the first set of heated bar assemblies are positioned at a height above the second set of heated bar assemblies. The first set of heated bar assemblies is positioned above the conveyor and the second set of heated bar assemblies is located below the conveyor. The conveyor lift configured to raise or lower the pallet between the raised position for using the first set of heated bar assemblies to form a seal and the lowered position for using the second set of heated bar assemblies to form a seal.

These and other embodiments are described below with references to the following figures.

BRIEF DESCRIPTION OF THE DRAWINGS

The disclosure will be readily understood by the following detailed description in conjunction with the accompanying drawings, wherein like reference numerals designate like structural elements, and in which:

FIGS. 10A-10C show a heat sealing head, in the form of a heated bar assembly, of a heat sealing apparatus according to embodiments of the technology.

FIGS. 11A-11C show side cross-sectional views of a heated bar according to embodiments of the technology.

DETAILED DESCRIPTION

Figure 1A:
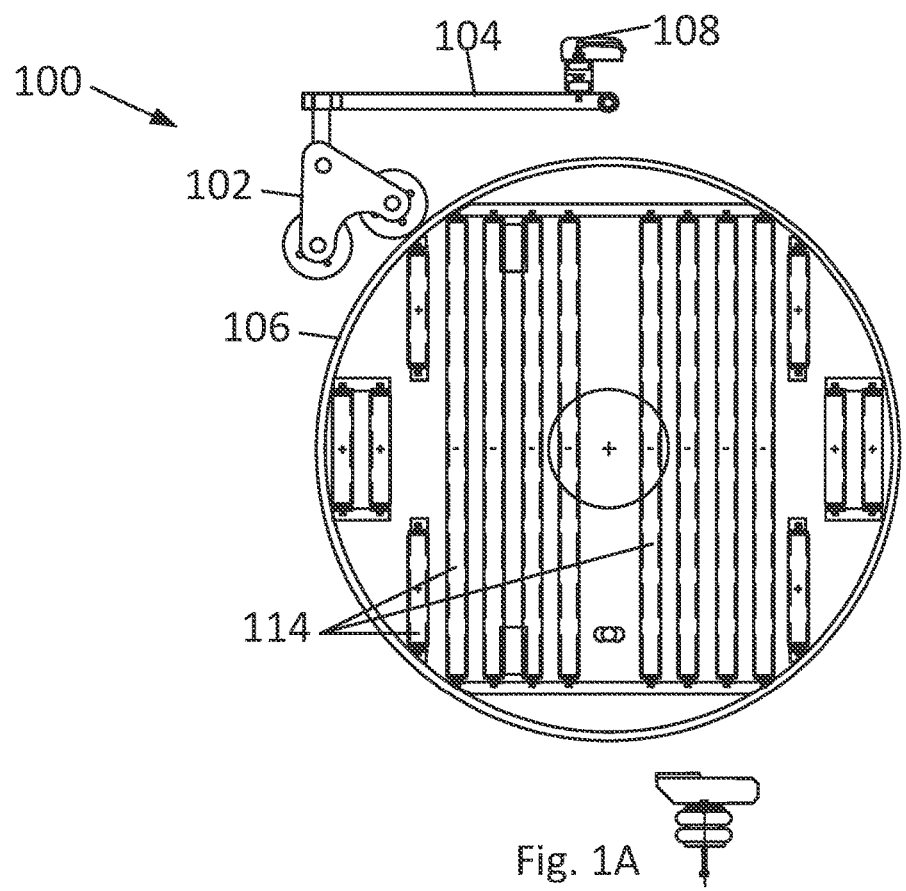
FIGS. 1A and 1B show a side view and a top view of a heat sealing apparatus according to embodiments of the technology.
Figure 1B:
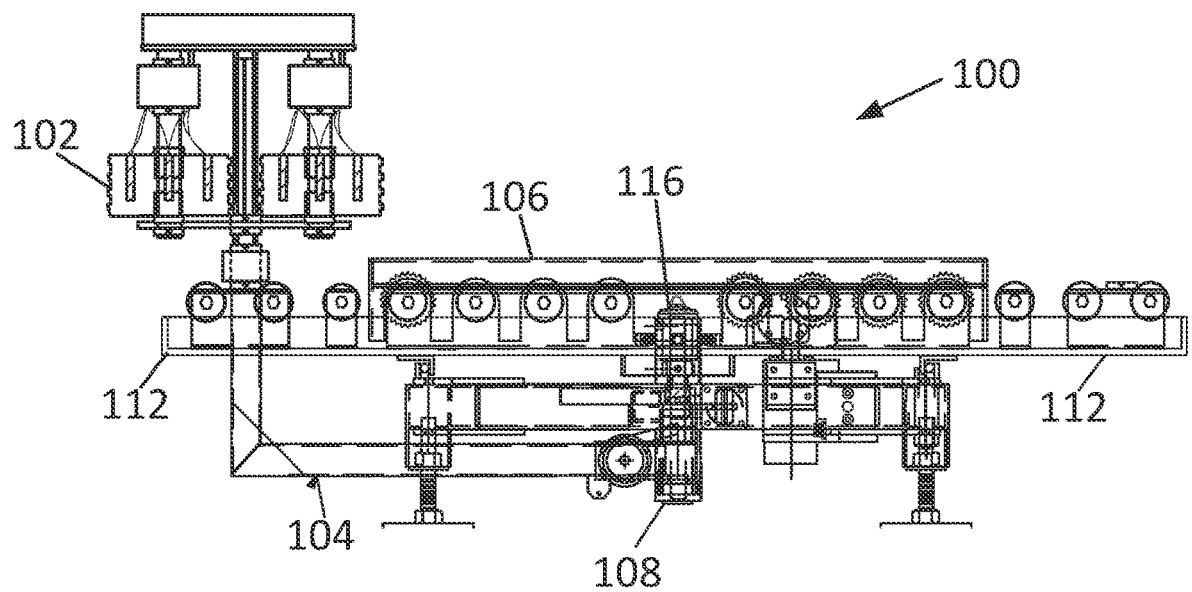

Throughout this description for the purposes of explanation, numerous specific details are set forth in order to provide a thorough understanding of the many aspects and embodiments disclosed herein. It will be apparent, however, to one skilled in the art that the many aspects and embodiments may be practiced without some of these specific details. In other instances, known structures and devices are shown in diagram or schematic form to avoid obscuring the underlying principles of the described aspects and embodiments.

Heating sealing apparatuses may be part of a system used to load and seal a load of containers of perishables onto a pallet. The system may include a plurality of stations used to perform specific tasks as will be discussed below. The pallet may be conveyed between the stations on a conveyor system. The conveyor system may comprise passive and/or automatic rollers and/or belts used to move the pallets from station to station.

Heat Sealing Apparatuses

FIGS. 1A, 1B, 1C and 1D show an embodiments of a heat sealing apparatus 100 and FIGS. 9A-9E show another embodiment of a heat sealing apparatus 900, either of which may be a station in a system used to load and seal a load of containers of perishables onto a pallet.

Heat Roller Heat Sealing Apparatus

As shown in FIGS. 1A-1D, a heat sealing apparatus 100 may comprise a sealing head 102, an arm 104, a turntable 106 and an arm actuator system 108. A pallet 110 may be conveyed onto and off of the turntable 106 using a conveyor system 112. As shown, the turntable 106 may comprise rollers 114 used to roll the pallet onto and off of the turntable 106.

Figure 1C:
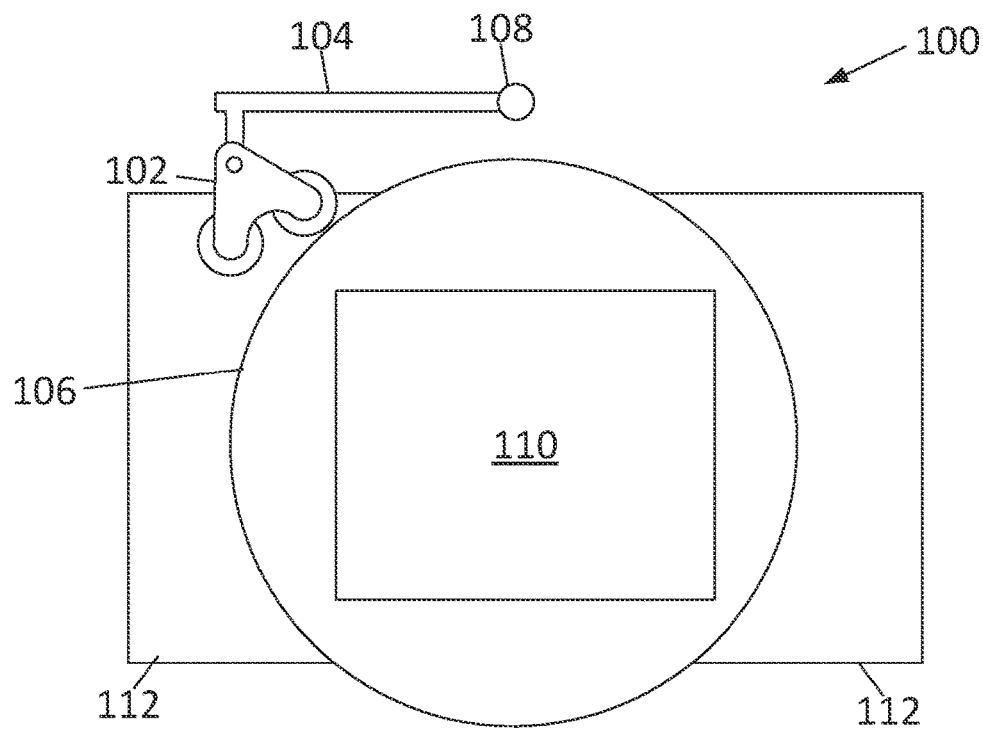
FIGS. 1C and 1D show a side view and a top view of a simplified schematic of a heat sealing apparatus according to embodiments of the technology.
Figure 1D:
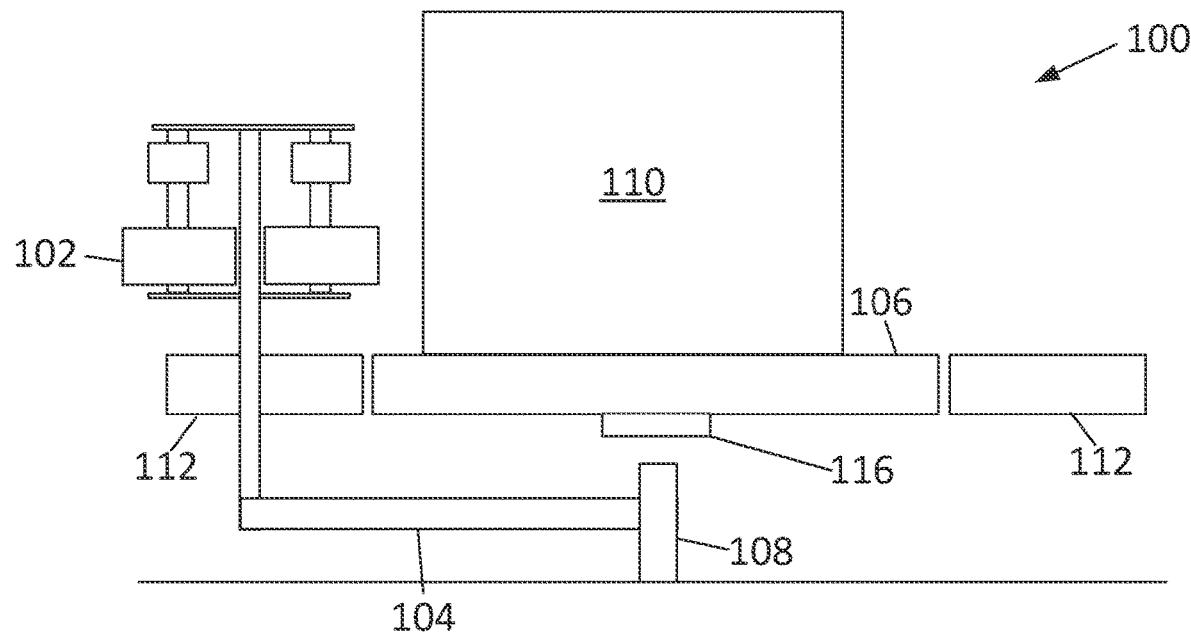

As shown in the top views of FIGS. 1A and 1C, on a side of the turntable 106 where the conveyor system 112 is not present the arm 104 is coupled to an arm actuator system 108. The arm actuator system 108 is mounted to a support structure or support surface, for example framing of the conveyor system 112 or the turntable 106, or mounted to the building floor, in order to be stationary relative to the conveyor system 112 and axis of rotation of the turntable 106. The turntable 106 comprises a turntable actuator 116. In embodiments, the turntable may be an electric motor or a hydraulic motor. The turntable actuator 116 causes the turntable 106 to turn around a vertical axis of rotation in order to turn the turntable 106 and pallet relative to the arm actuator 108 and conveyor system 112. The turntable 106 may turn 360 degrees or greater in order to fully rotate the pallet relative to the arm 104 and sealing head 102. FIGS. 1C and 1D show simplified schematic views of the heat sealing apparatus 100, with the structures supporting the turntable 106 and conveyor system 112 omitted for clarity.

Arm

The arm 104 of the heat sealing apparatus 100 may be used to position a sealing head 102 against a palletized load in order to form a heat seal around the perimeter of the palletized load. In embodiments, for example as shown in FIGS. 1A and 1C, the arm 104 is coupled to the arm actuator system 108 at a first end and coupled to the sealing head 102 at a second end opposite end the first end. The arm actuator system 108 may include a resilient element, for example a spring or an air bag, coupled to the arm 104. In embodiments, for example as shown in FIGS. 1A and 1C, the arm 104 is L-shaped with a longer portion coupled to the arm actuator system 108, a shorter portion coupled to the sealing head 102, and an inner corner facing toward the turntable 106. In embodiments, the arm 104 may be curved and/or have one or more articulating sections.

Arm Actuator System

Figure 6:
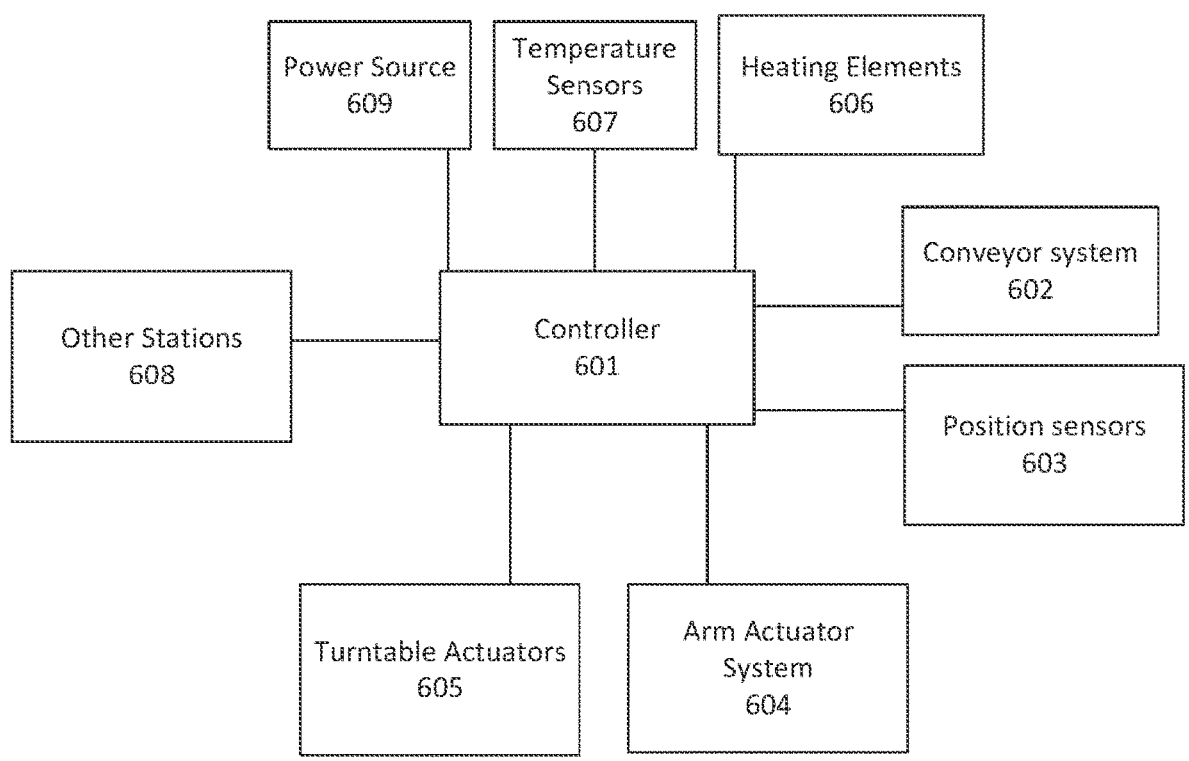
FIG. 6 shows a controller schematic of a heat sealing apparatus according to embodiments of the technology.

The arm actuator system 108 comprises an actuator, in embodiments an electric motor, to cause the arm 104 to pivot around a vertical axis in order to rotate the sealing head 102 coupled to the arm 104 toward and away from the rotational axis of the turntable 106, and therefore the pallet rotating on the turntable 106. The arm actuator system 108 may be controlled by a controller 601, for example as shown in FIG. 6, to position the arm 104 based on a set angular position and/or a set torque/force/pressure. Torque, force and/or pressure, may be determined by one or more sensors on the arm 104, sealing head 102, or the arm actuator system 108. For example, during use the controller 601 may cause the sealing head 102 to contact a palletized load with a fixed constant pressure. The fixed constant pressure may be detected for example by detecting a torque on the arm 104, a torque of a motor, and/or force sensors on the arm 104 or sealing head 102.

In embodiments, as noted above the connection between the arm actuator system 108 and the arm 104 may comprise a resilient element. For example, an air bag may be positioned and coupled between the arm 104 and the arm actuator system 108 in order to allow the arm 104 to rotate relative to the set angular displacement of an electric motor of the arm actuator system 108 in order to prevent excessive force from being applied to the load on the pallet. The airbag may limit the amount of torque exerted by the arm 104 so that the force/pressure exerted by the sealing head 102 onto the load is limited so that the perishable products within the loaded containers are not damaged. The spring coefficient of the resilient member may be selected to maintain a minimum force/pressure needed to form a heat weld seal of the plastic bag and plastic sheet.

In embodiments, the arm actuator system 108 may comprise a linear actuator in order to allow for vertical translation of the arm 104 in order to set the sealing head 102 to various vertical heights to adjust the height of the seal band relative to the pallet and load of containers.

Sealing Head

One or more sealing heads 102 of a heat sealing apparatus 100 may be used to form a heat seal around the entire perimeter of the palletized load in order to seal the modified atmosphere within the plastic bag and plastic sheet. In embodiments, the one or more sealing heads include one or more heated surfaces brought in contact with the overlap of the plastic bag and plastic sheet. In embodiments, the turntable 106 may be used to orient the palletized load relative to the one or more sealing heads 102 in order to form the heat seal band around the entire perimeter of the palletized load.

Figures 2A, 2B, 2C:
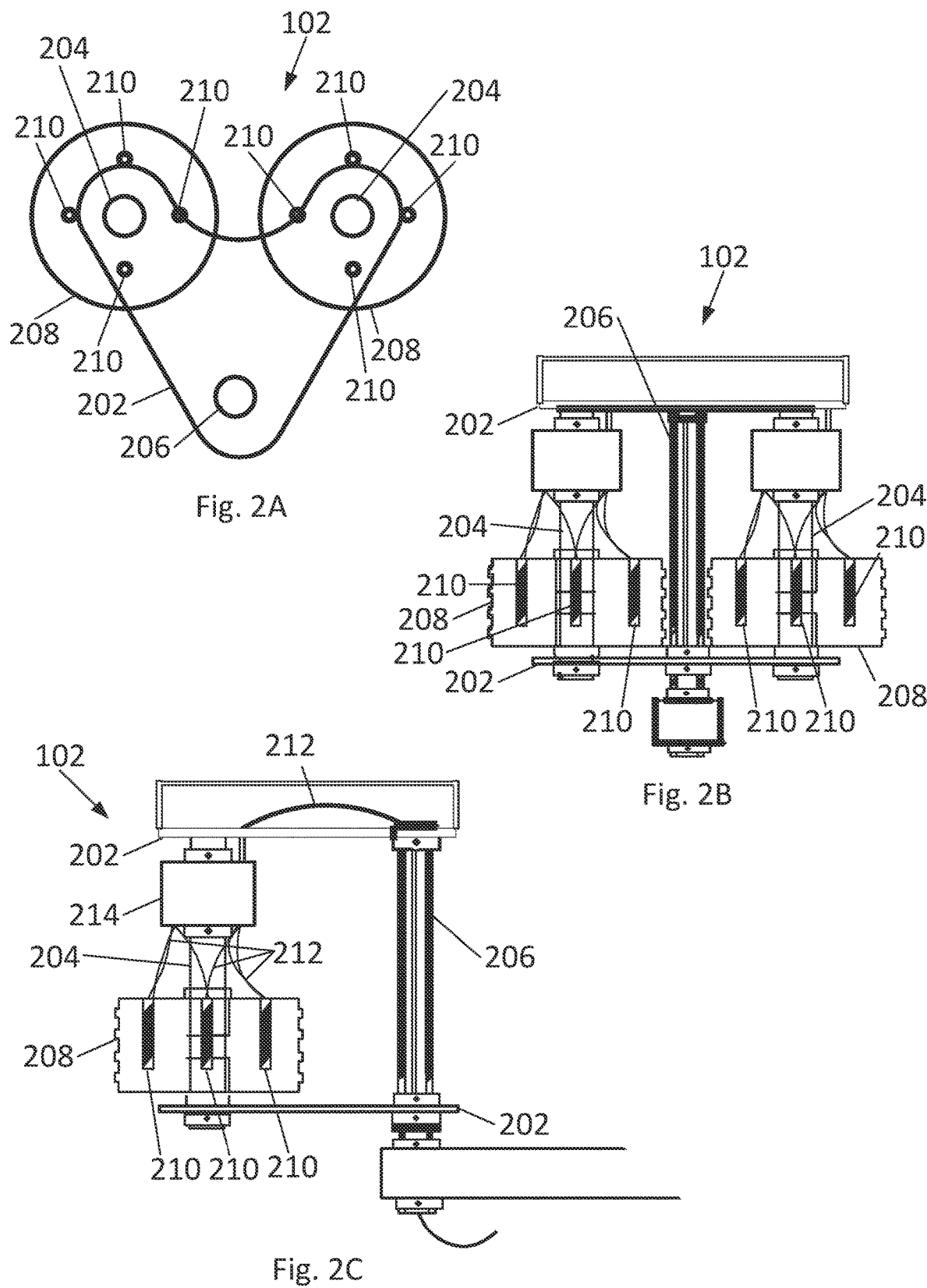
FIGS. 2A-2C show a heat sealing head of a heat sealing apparatus.

In embodiments, for example as shown in FIGS. 2A-2C, a sealing head 102 may include at least one heat roller and a coupling that rotatably couples the sealing head to the arm. In embodiments, for example as shown in FIG. 2A, the sealing head 102 comprises two horizontal triangular plates 202 spaced apart parallel to each other in a generally vertical direction. Between the two triangular plates 202 are two roller axles 204 and an arm coupling axle 206. The three axles 204 and 206 are arranged in a triangular arrangement toward the corners of the triangular plates 202. Each axle 204 and 206 extends along a respective axis of rotation, and the three axes of rotation of the three axles 204 and 206 may all be parallel to each other, and may be oriented in the vertical direction.

Each of the roller axles 204 includes at least one heat roller 208 attached to the roller axle 204. The heat rollers 208 may rotate with or around the roller axle 204 so that the heat rollers 208 rotate around the axis of rotation of the roller axle 204 that the heat roller 208 is coupled to. Specifically, the heat rollers 208 may be fixedly coupled to the roller axles 204 and the roller axles 204 may be rotationally coupled to the triangular plates 202 so that each roller axle 204 and heat roller 208 rotate with each other relative to the triangular plates 202. Alternatively, the heat rollers 208 may each be rotationally coupled to the roller axles 204 with the roller axles 204 either fixedly coupled or rotationally coupled to the triangular plates 202 in order for the heat rollers 208 to be able to freely rotate relative to the roller axles 204.

As shown in FIG. 2B, each of the two roller axles 204 may have a single heat roller 208 coupled thereto. The heat rollers 208 of each roller axle 204 may be positioned the same distance between the two triangular plates 202 so that the outer surfaces 302 of the heat rollers 204 roll along a common roll path.

Heat Rollers

Figure 3A:
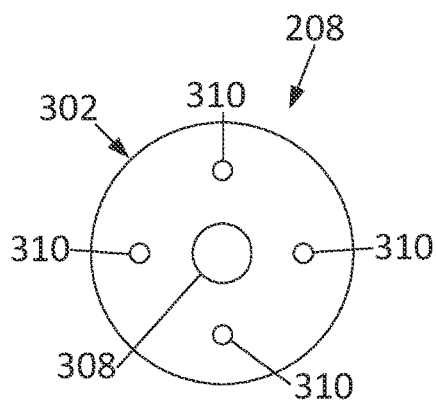
FIGS. 3A-3C show an embodiment of a heat roller according to embodiments of the technology.
Figure 3B:
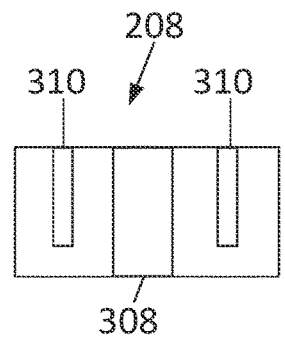
Figure 3C:
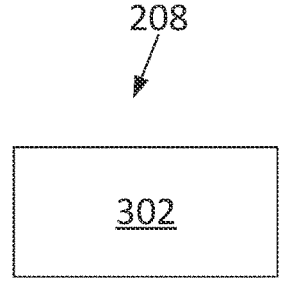

The heat roller 204 are heated and used to apply pressure and heat to cause the plastic bag to seal to the plastic sheet, for example through means of plastic welding. The heat rollers 208 may have a generally round perimeter around the outer surface of the heat roller 208. The heat rollers 204 may be between 8" and 12" in diameter, but may be larger or smaller. In embodiments, the outer surfaces 302 may be substantially cylindrical for example as shown in FIGS. 3A-3C. As shown in FIGS. 3A-3C, the cylindrical outer surface 302 comprises walls that are parallel to the axis of rotation of the roller axle 204 that the heat roller 208 is coupled to.

Figure 4A:
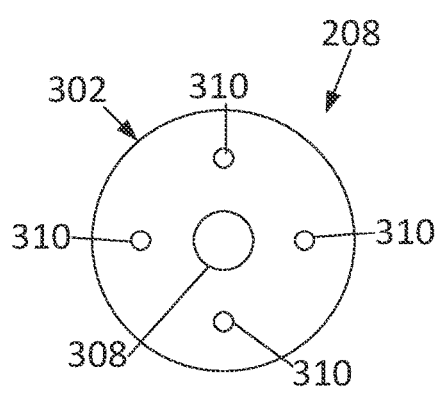
FIGS. 4A-4C show an embodiment of a heat roller according to embodiments of the technology.
Figure 4B:
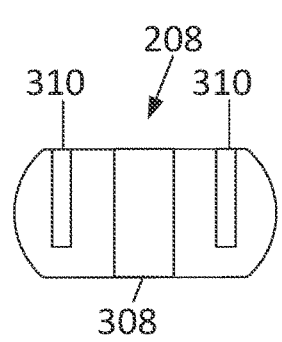
Figure 4C:
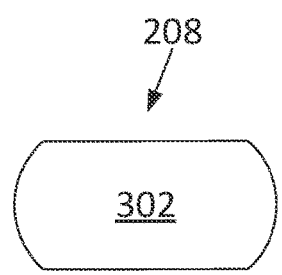

In embodiments, the profile of the heat rollers 204 may be curved so that the outer surface 302 forms a curve toroid, also referred to as a donut shaped outer surface, for example as shown in FIGS. 4A-4C. Curved toroid outer surfaces 302 have the advantage of concentrating pressure and heat toward the equatorial portion of the outer surface 302 of the heat rollers 208 in order to transfer heat over a vertical area to cause the plastic of the bag and sheet to seal together across a vertical width. The curved toroid outer surface 302 also allows the roller to conform to uneven and/or yielding underlying surfaces of perishable containers so that the contacting surface area of the heat roller 208 increases to include portions of the outer surface 302 above and below the equatorial portion when these uneven and/or yielding underlying surfaces are encountered. The seal band formed by the toroid profile roller may therefore have a non-uniform vertical width around the perimeter of the plastic bag/sheet.

Figure 5A:
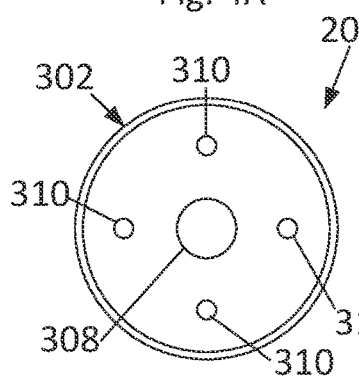
FIGS. 5A-5C show an embodiment of a heat roller according to embodiments of the technology.
Figure 5B:
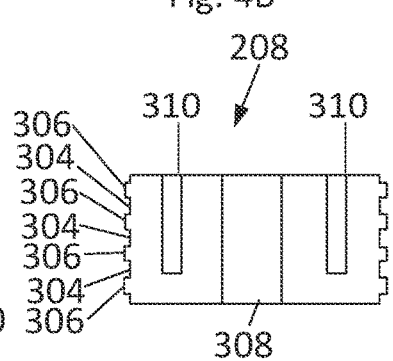
Figure 5C:
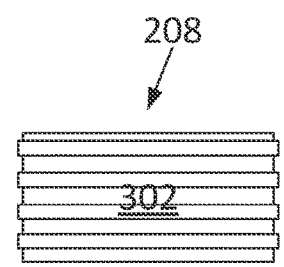

In addition to the overall profile of the outer surfaces 302 of the heat rollers 208, the outer surfaces 302 may have additional surface characteristics. For example, in embodiments the outer surfaces 302 may be grooved, for example as shown in FIGS. 5A-5C which shows a cylindrically profiled outer surface 302 with a plurality of grooves 304. The grooves 304 may be rectangular trenches defining cylindrical surface bands 306 around the outer periphery of the outer surface 302. In use, the cylindrical surface bands may each form a distinct seal band around the plastic bag/sheet, with un-sealed bands between the seal bands defined where the trenches travel over the plastic bag/sheet. Multiple seal bands have the advantage of redundancy if one of the seal bands fails.

In embodiments, the heat rollers 208 are made of a material with a high thermal conductively, for example a metal, in order to transfer heat to seal the plastic bag and the plastic sheet together. The heat roller may 208 be cast, machined, assembled from multiple pieces, or any combination of these or other manufacturing techniques. The heat roller 208 may be made for example of aluminum, steel, brass or copper.

When sealing a plastic bag to a plastic sheet, the outer surface 302 of the heat roller 208 may directly contact the plastic bags or sheets that are being sealed. The portions of the outer surface 302 that contact the plastic material may have a smooth surface, such as a machined metal surface. In embodiments, the outer surface 302 that contacts the plastic material may have a textured or patterned surface. For example a patterned surface may have dimples with a diameter of less than 2 mm, or a pattern of crisscrossed grooves less than 2 mm deep. The patterned surface may give the heat roller traction so that the heat roller rolls along the plastic to be sealed as opposed to sliding without the heat roller 208 rolling.

In embodiments, the outer surface 302 of the heat rollers 208 may comprise a coating or outer layer of a polymer material. For example, the outer surface 302 may comprise a layer of Teflon sheet/tape on top of an underlying metal surface of the heat roller. For example, the embodiments shown in FIGS. 3A-C, 4A-C, and 5A-C may have a Teflon tape outer coating. In embodiments, the coating may be sprayed on, such as a paint. The outer layer may provide a smooth non-stick surface to prevent the softened plastic of the bag and/or sheet from sticking to the heat roller 208 and/or provide a degree of resilience/give to ensure that the heat roller 208 is continuously pressed against and contacting the underlying plastic bag or sheet while sealing.

Figure 5D:
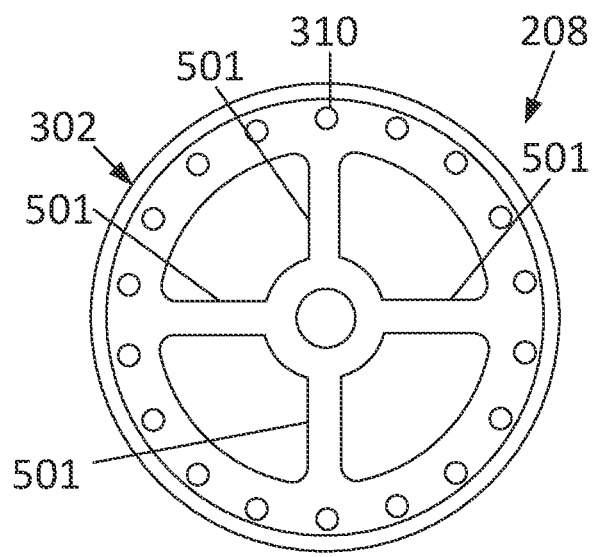
FIGS. 5D-5F show an embodiment of a heat roller according to embodiments of the technology.
Figure 5E:
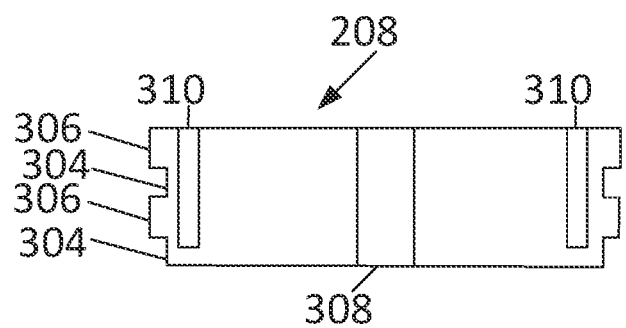
Figure 5F:
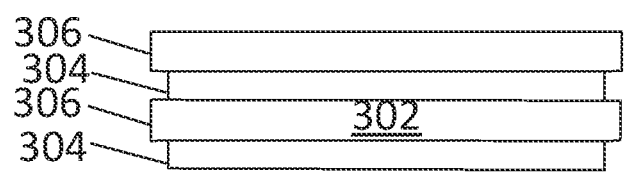

As shown for example in FIG. 3A, a heat roller 208 includes an axle sleeve 308 extending through the center of the heat roller 208. The roller axle 204 extends through the axle sleeve 308, and as previously noted the heat roller 208 may be rotatably coupled to the roller axle 204, or may be fixedly coupled to the roller axle 204 with the roller axle 204 rotatably coupled to the triangular plates 202. The axle sleeve 308 may extend between the top and bottom surfaces of the heat roller 208. In embodiments, the heat roller 208 may be hollow in that one or more voids are located between the outer surface and the axle sleeve. For example, FIGS. 5D-5F show in an embodiment of a heat roller 208 including spokes 501. The hollow portions, for example between the spokes 501, may reduce the cost of materials and may make the heat roller have a lower moment of inertia so that the heat roller more readily freely rotates when acted upon by the outside force. Further, the voids reduce heat transfer from the perimeter to the hub of the heat roller so that input heat energy is not wasted by heating bodies other than the outer surface 302 of the heat roller.

In embodiments, the heat rollers 208 are coupled to the roller axle 204 with heat insulating bearings positioned within the axle sleeve 308 between the heat roller 208 and the roller axle 204. In embodiments, the roller axles 204 are made of a material, with a low heat conductivity, for example Polyether ether ketone (PEEK). The heat insulating bearings and low thermal conductivity roller axle 204 create a more consistent control of the temperature of the outer surfaces 302 of the heat rollers 208 by preventing the transfer of heat to the other metal components of the sealing head 102 or arm 104 which would result in heat dissipating and being wasted to the environment, which may be a refrigerated environment, e.g. 0 degrees Celsius, where a lowered temperature is kept to preserve freshness of the perishables being loaded onto the pallet.

As shown in the top views of FIGS. 3A, 4A and 5A each heat roller 208 may define a plurality of cavities 310 to receive heating elements 210. The cavities 310 may be cylindrical with a bottom surface, as shown in the cross-sectional views of FIGS. 3B, 4B, and 5B. The depth of the cavities 310 extends past the equatorial plane of the heat roller 208 so that the portions of the outer surface 302 above and below the equatorial portion receive heat from the heating elements 201. The cavities 310 may be evenly spaced around the perimeter of the heat roller 208 to create a substantially uniform outer surface 302 temperature profile. For example, 4 heating elements may be spaced at 90 degrees, 5 heating elements at 72 degrees, or 18 heating elements at 20 degrees.

The heating elements 210 may all have the same wattage. For example, the heat roller may comprise four 500 watt heating elements, or eighteen 100 watt heating elements. The heating elements may be selected to be able to run on a 20 amp 120 volt AC outlet.

As shown in FIGS. 2B and 2C, cables 212 providing power to the heating elements 210 may extend from the tops of the heat rollers 210 into a slip electrical commutator 214 mounted to the roller axle 204. The electrical commutator 214 allows power to be delivered to the heating elements while allowing the heated rollers to continuously rotate past 360 degrees without the cables 212 tangling. Power is supplied through the electrical commutator from cables 212 extending through the coupling axle 206 and then connected to a power source 609 coupled to the controller 601. In embodiments, the sealing head 102 comprises electrical contactors mounted onto the triangular plates 202 that are used to control the current to the heating elements 210 in order to maintain the correct temperature. In embodiments, rheostats may be used to control the current to the heating elements 210.

Bar Heat Sealing Apparatus

Figure 9A:
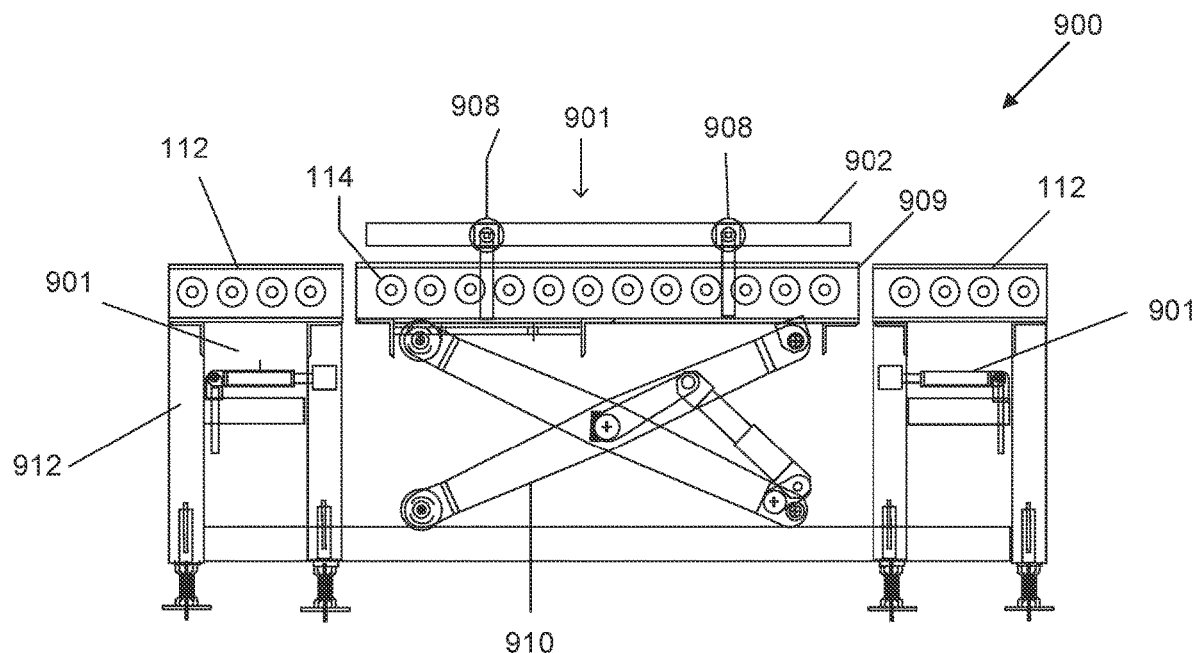
FIGS. 9A and 9B show a top view and a side view of a heat sealing apparatus according to embodiments of the technology.
Figure 9B:
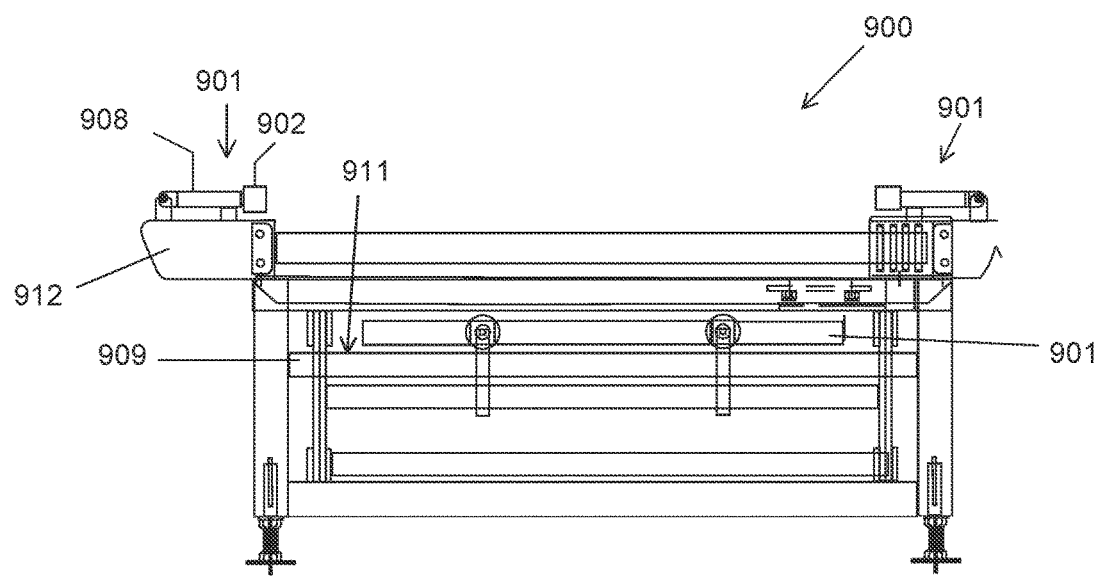

FIGS. 9A and 9B show a heat sealing apparatus 900 that may be a station in a system used to load and seal a load of containers of perishables onto a pallet. As shown, the heat sealing apparatus 900 may comprise a plurality of heated sealing heads in the form of heated bar assemblies 901. Each heated bar assembly 901 may include a sealing head in the form of a heated bar 902, and an actuator system 908. The heat sealing apparatus 900 may further contain a conveyor lift 909. The conveyor lift 909 may be sized to receive a pallet 110, and be positioned as part of the conveyor system 112 so that an upstream conveyor system portion may transfer a pallet onto the conveyor lift 909 from front edge of the conveyor lift 909, and the conveyor lift may transfer a pallet 110 off of the conveyor lift 909 and onto a downstream conveyor portion from a rear edge of the conveyor lift. In some embodiments, the conveyor lift 909 may comprise rollers 114 used to roll the pallet onto and off of the conveyor lift 909. The conveyor lift 909 may be coupled to vertical actuators 910 in order to change the vertical position of the conveyor lift 909 relative to the conveyor system 112. In embodiments, the vertical actuators 910 may be a scissor lift. The conveyor lift 909 may be positioned in a raised position, with the vertical actuators 910, wherein the pallet receiving surface 911 is coplanar with the conveyor system 112, and may be positioned in a lowered position wherein the pallet receiving surface is below the conveyor system 112.

Figure 9C:
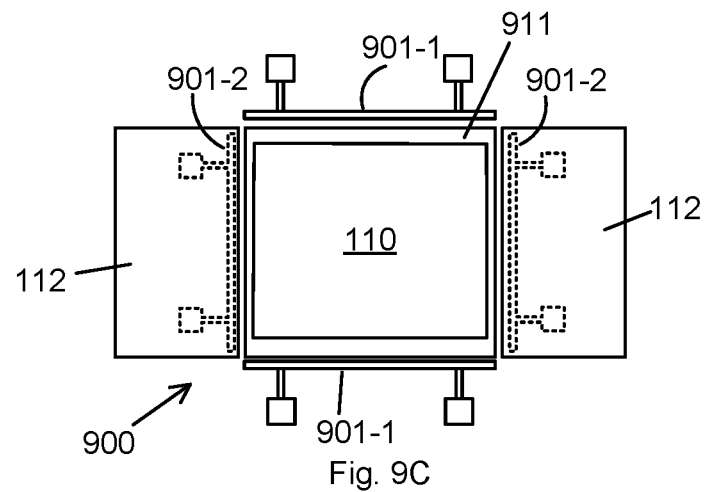
FIGS. 9C-9E show a top view, a side view, and an end view of a simplified schematic of a heat sealing apparatus according to embodiments of the technology.
Figure 9D:
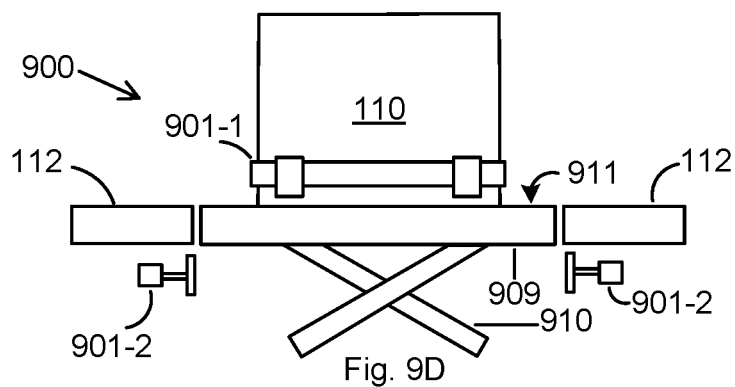
Figure 9E:
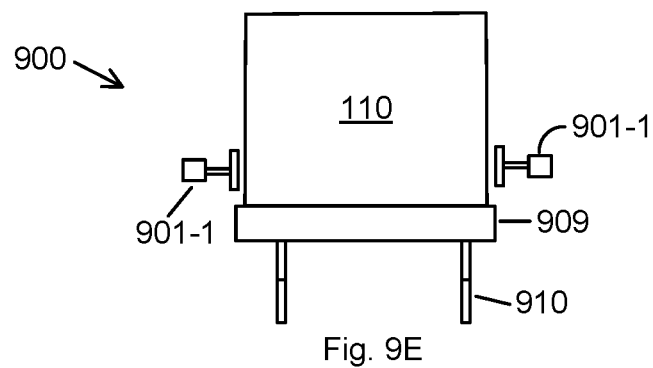

As shown in the top views of FIG. 9C, the plurality of heated bar assemblies 901 may include a first set of heated bar assemblies 901-1 arranged to oppose a left and a right edge of the conveyor lift 909. In some embodiments, for example a shown in FIGS. 9D and 9E, the first set of heated bar assemblies 901-1 may be positioned above the conveyor system 112. For example as shown the left and right heated bar assemblies 901-1 may be above the pallet receiving surface 911 when the conveyor lift 909 is in the raised position so that the first set of heated bar assemblies 901-1 may be used to form a left seal and a right seal on a bagged pallet on the pallet receiving surface, as will be discussed in greater detail below. As shown, left and right heated bar assemblies 901-1 may be arranged at the same vertical position. In some embodiments, the left and right heated bar assemblies 901-1 may be positioned below the conveyor system 112 so that the first set of heat bar systems may be used form a left seal and a right sealed on a bagged pallet on the pallet receiving surface when the conveyor lift is in the lowered position.

As shown in the top schematic view of FIG. 9C, the plurality of heated bar assemblies 901 may also include a second set of heated bar assemblies 901-2 arranged to oppose the front and rear edge of the conveyor lift 909. As shown in the side schematic view of FIG. 9D, the second set of heated bar assemblies 901-2 may be positioned below the conveyor system 112. As shown a front heated bar assembly 901-2 of the second set of heated bar assemblies 901-2, below the first portion of the conveyor 112 and a rear heated bar assembly 901-2 may be arranged below the second portion of the conveyor 112. The front and rear heat bar systems may be arranged at the same vertical position. In some embodiments, the vertical position of the second set of heated bar assemblies 901-2 may be above the pallet receiving surface 911 when the conveyor lift 909 is in the lowered position so that the second set of heated bar assemblies 901-2 may be used to form a front seal and a rear sealed on a bagged pallet 110 on the pallet receiving surface, as will be discussed in greater detail below.

Heat Bar Assemblies

Each heat bar assembly 901 may include one or more actuators 908 coupled to one or more heated bars 902. For example, as shown in FIGS. 10A, each heat bar assembly 901 may include two actuators 908 coupled to one heated bar 902. Each actuator 908 may additionally be coupled to a portion of a support structure 912, for example framing of the conveyor system or conveyor lift as shown in FIGS. 9A and 9B. In embodiments, the actuators 908 may be linear actuators for translating the heat bars in a horizontal plane toward and away from a bagged pallet on the lifting surface. For example as shown, the heated bar 902 may be translated relative to the support structure between a retracted position, as shown in FIG. 10B, and an extended position, as shown in FIG. 10C. In some embodiments, the linear actuator may be motor operated, push-pull mechanism, sliding bar, cylinder piston arrangement or other linear actuators. In some examples, the actuators may allow for control of the position of the heated bars in multiple degrees of freedom, for example to adjust the height and/or alignment of the seal on a bagged pallet.

The plurality of heat sealing bar assemblies 901 may be sized and arranged to form a heat seal around the perimeter of the palletized load. For example, as shown in the top schematic view of FIG. 9C, each heat bar assembly 901 includes a heated bar 902 that is positioned opposite a respective side of the load on the pallet 110. Further as shown, each heated bar 902 is wider than the respective side so that the a seal may be formed along the entire side as well as have a tolerance for variations in load widths and variations in the positioning of the lead relative to the heat sealing bar assemblies.

Figure 12:
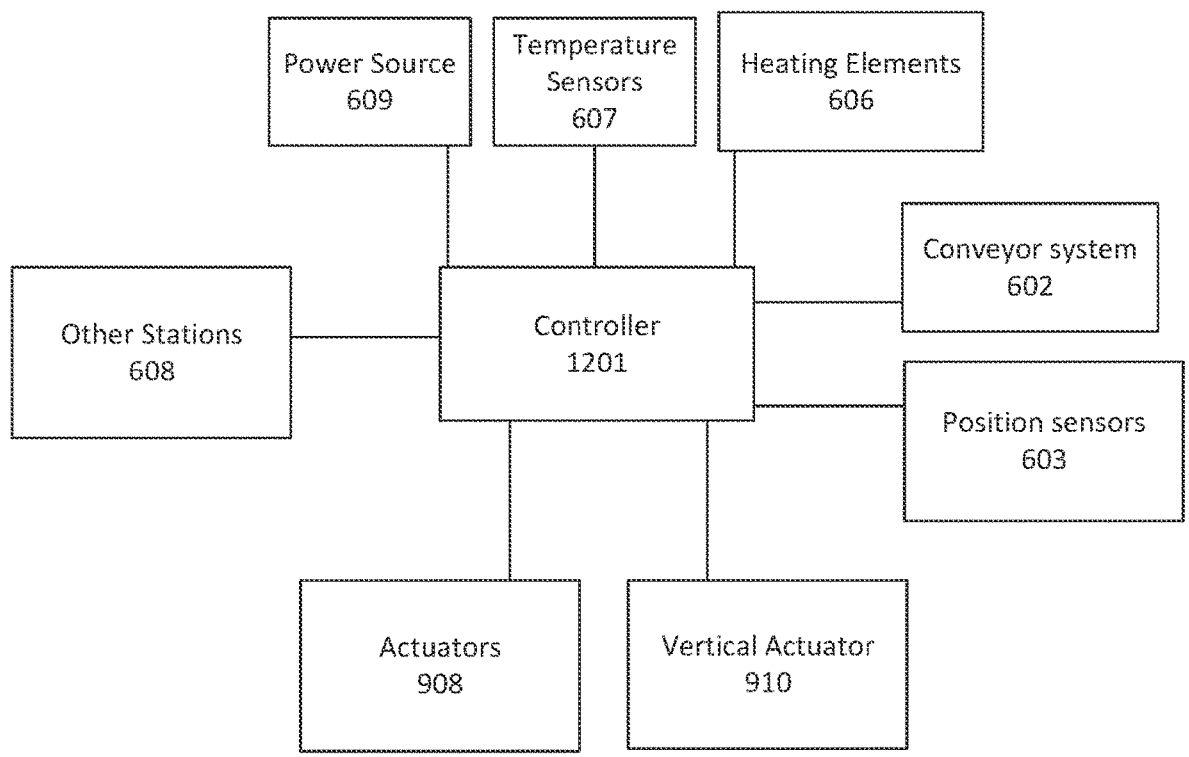
FIG. 12 shows a controller schematic of a heat sealing apparatus according to embodiments of the technology.

The actuators 908 and the vertical actuators 910 may be controlled independently and cooperatively by the controller 1201, for example as shown in FIG. 12. During use the controller 1201 may cause each heated bar 902 to extend from the retracted position to the extending position in order to contact a palletized load in order to form four seal sections forming continuous seal around the palletized load. In embodiments, a heat bar assembly 901 may include one or more pressure sensors and/or position sensors 603 for determining and controlling contact of the heat bar with the palletized load.

Heated Bar

A plurality of heated bars 902 of a heat bar sealing apparatus 900 may be used to form a heat seal around the entire perimeter of a palletized load in order to seal the modified atmosphere within the plastic bag and plastic sheet. In embodiments, the plurality of heated bars include one or more heated surfaces brought in contact with the overlap of the plastic bag and plastic sheet.

The heated bars 902 are heated and used to apply pressure and heat to cause the plastic bag to seal to the plastic sheet, for example through means of plastic welding. The heat bars may have a generally planar outer surface. The heat bar outer surfaces may be rectangular and may have a length corresponding to the length of the pallet which the heat bar is used to seal a load a top. The heat bar outer surface defines a height corresponding to the desired height of the seal.

In embodiments, the profile of the heat bar may be curved for example as shown in FIG. 11B. Curved outer surfaces have the advantage of concentrating pressure and heat in order to conform to uneven and/or yielding underlying surfaces of perishable containers so that the contacting surface area of the heat bar. The seal band formed by the curved profile heat bar may therefore have a non-uniform vertical width around the perimeter of the plastic bag/sheet.

In addition, to the profile of the outer surfaces of the heat bars may have additional surface characteristics. For example, in embodiments the outer surfaces may be grooved, for example as shown in FIG. 11C. The grooves may be rectangular trenches between rectangular bands, for example as shown in FIG. 11C. In use, each band may form a distinct seal band around the plastic bag/sheet, with un-sealed bands between the seal bands defined where the trenches are positioned over the plastic bag/sheet. Multiple seal bands have the advantage of redundancy if one of the seal bands fails.

In embodiments, the heat bars are made of a material with a high thermal conductively, for example a metal, in order to transfer heat to seal the plastic bag and the plastic sheet together. The heat bars may be cast, machined, assembled from multiple pieces, or any combination of these or other manufacturing techniques. The heat bars may be made for example of aluminum, steel, brass or copper.

When sealing a plastic bag to a plastic sheet, the outer surface of the heat bar may directly contact the plastic bags or sheets that are being sealed. The portions of the outer surface that contact the plastic material may have a smooth surface, such as a machined metal surface. In embodiments, the outer surface that contacts the plastic material may have a textured or patterned surface. For example a patterned surface may have dimples with a diameter of less than 2 mm, or a pattern of crisscrossed grooves less than 2 mm deep.

In embodiments, the outer surface of the heat bars may comprise a coating or outer layer of a polymer material. For example, the outer surface may comprise a layer of Teflon sheet/tape on top of an underlying metal surface of the heat bar. In embodiments, the coating may be sprayed on, such as a paint. The outer layer may provide a smooth non-stick surface to prevent the softened plastic of the bag and/or sheet from sticking to the heat bar and/or provide a degree of resilience/give to ensure that the heat bar is pressed against and contacting the entire width of the underlying plastic bag or sheet while sealing.

Each heat bar may define a plurality of cavities to receive heating elements, as discussed above relating to the heat rollers. The cavities may be cylindrical with a bottom surface, as shown in the cross-sectional views of FIGS. 11A, 11B, and 11C. The cavities may be evenly spaced along the length of the heat bar to create a substantially uniform outer surface temperature profile.

Methods of Use

Embodiments of the heat sealing apparatus 100 and 900 as disclosed above may be in a pallet bagging line. Bagging lines may include a plurality of stations/modules for example to load the pallet, place the plastic sheet, fold the plastic sheet, place the bag on the load, seal the plastic bag to the plastic sheet, and deliver a modified atmosphere into the bag. Example of stations/modules are disclosed for example in U.S. Pat. No. 4,821,489 to Macleod et al, U.S. Pat. No. 7,770,366 to Macleod et al., U.S. Pat. No. 5,014,495 to Bolejack et al., U.S. Pat. No. 5,046,302 to Bolejack et al., U.S. Pat. No. 5,111,639 to Bolejack et al., U.S. Pat. No. 5,314,286 to Bolejack et al., U.S. Pat. No. 6,532,717 to Forgnone, and U.S. PgPub US2005/0183397A1 to Forgnone, each of which are incorporated in their entireties.

Each of the stations may be connected to a control system for example as shown in FIGS. 6 and 12 that is also connected to other sensors and actuators as described above. For example as shown, the controller 1201 may be coupled to a conveyor system 602, position sensors 603, an arm actuator system 604, turntable actuators 605, heating elements 606, temperature sensors 607, actuators 908, vertical actuators 910 and/or other stations 608

Placing Sheet Under Pallet

Prior to or after a load of containers of perishables is placed on a pallet, a plastic sheet may be positioned on a pallet so that a plastic sheet is present between the load and the pallet. For example, a pallet bearing a plurality of containers of fresh perishables may be placed on a conveyor. A lifting device may squeeze and lift the load apart from the pallet and a plastic sheet may be automatically inserted onto the pallet in the gap created above the pallet and below the suspended load. The plastic sheet is larger than the pallet with margins extending beyond the edges of the pallet on all sides. The margins may be 6 inches or greater. The plastic sheet and the plastic bag may be made of polymers, specifically thermoplastics capable of being welded together, for example Low-density polyethylene.

After the sheet is in place, and the containers of perishables are positioned atop the pallet and sheet and the resulting pallet unit is conveyed to the next station in the bagging line. For example the next station may be a bagging station or an optional sheet folding station.

Sheet Folding Station

A folding station may be used to automatically position and fold the overhanging margins of the bottom sheet upwards, against the sides of the perishables containers atop the pallet. At the folding station, a folder system may sense the presence of a load bearing pallet, and activates a corner fold-forming system that folds the margins of the pallet sheet upwardly against the load at all four corners of the pallet. The system may then heat seal each corner fold, simultaneously or sequentially, in order for the plastic sheet to a rectangular open topped vessel. Alternatively, the folded corners may be held in place physically or by air as the bag is lowered over the load.

Bagging Station

With the lower sheet in place, the pallet may be bagged. At a bagging station, a plastic bag may be applied from above the palletized unit. The bag may be stretched over, and then down the exterior surfaces of the stacked unit. Once the stretched film is released, the film, which forms a bag, may be effectively pulled tightly against the exterior surfaces of the pallet units. Tension of the stretched bag against the pallet unit surfaces may brace and stabilize the palletized unit.

The system may then hold the plastic sheet margins in a vertical position while the bag is descended to overlap and capture the sheet margins, or the plastic sheet margins may be folded and heat sealed in a vertical position as disclosed above.

The bag opening may be positioned above the plane of the pallet bottom surface, leaving a portion (e.g., two inches) of the vertically positioned bottom sheet exposed. The bag overlaps the remaining portions of the bottom sheet. The elasticity of the bag may hold the folded sheet margins in place under the bag. If the corners are not heat sealed, the system holding the sheet margins upwards may be withdrawn or cycled off once the bag is in place.

Alternatively, the system may be configured to stretch and place the bag over the palletized load, and the margins of the bottom sheet may then be folded or otherwise placed upwardly outside the margins of the bag/enclosure. In both cases, an overlap area of the bag and sheet is formed around the entire perimeter of the palletized load.

Heat Sealing Station

Once bagged, the bagged pallet may then be conveyed to a heat sealing apparatus 100 or 900, for example as shown in FIGS. 1A-1D and 9A-9E disclosed above.

For example, in embodiments the bagged pallet may be conveyed on the conveyor system to be centered on the turntable of the heat sealing apparatus or may be conveyer on the conveyor system onto the pallet receiving surface 911. The heat sealing apparatus may be used to form a seal on the overlap between the plastic sheet and plastic bag around the entire perimeter of the palletized load in order to provide a seal for the modified atmosphere.

Figure 7A:
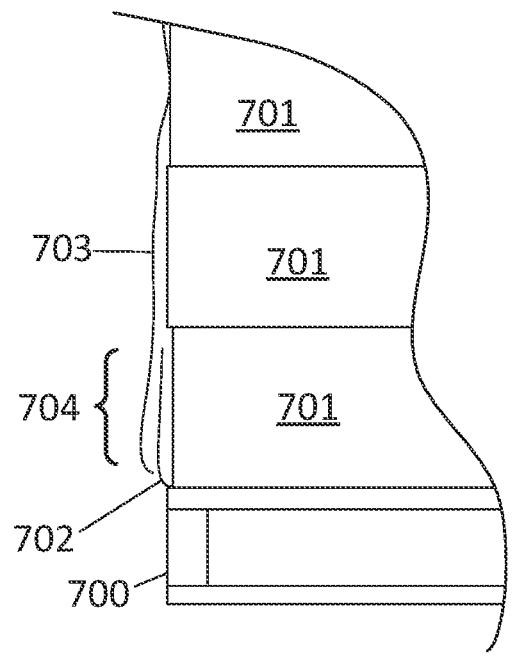
FIGS. 7A and 7B show a sealing process with a heat roller according to embodiments of the technology.
Figure 7B:
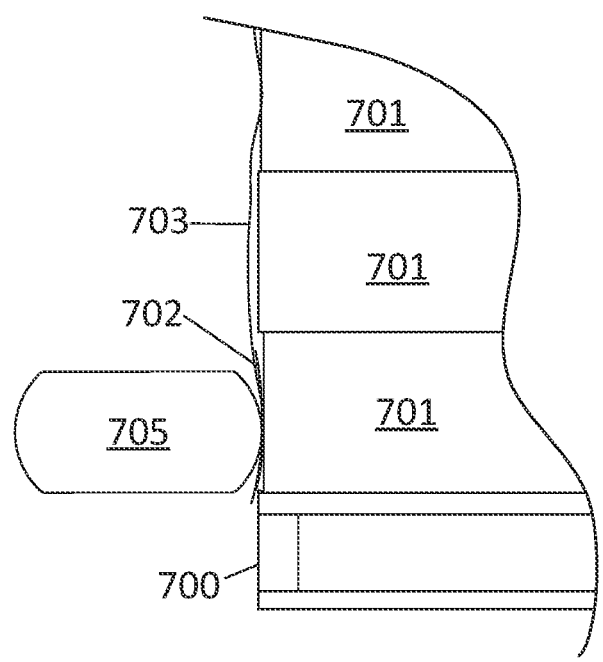

As disclosed above, the plastic bag and plastic sheet overlap to form an overlap area around the entire perimeter of the palletized load. FIG. 7A shows a portion of a palletized load of a plurality of containers of perishables 701 on a pallet 700. The plastic sheet 702 under the load is folded up and under the plastic bag 703 to form an overlap area 704. Once overlapped, a sealing head 102, for example but not limited to the sealing heads as disclosed in FIGS. 2A-2C, may be used to seal the plastic bag 703 to the plastic sheet 702. For example, as shown in FIG. 7B a heat roller 705 of a sealing head 102 is pressed against the overlap area 704 to causes the overlap area to be pressed between the surface of the underlying container 701 and the heat roller 705 so that the heat from the heat roller welds the plastic sheet 702 to the plastic bag 703 to form an airtight seal band.

Figure 8A:
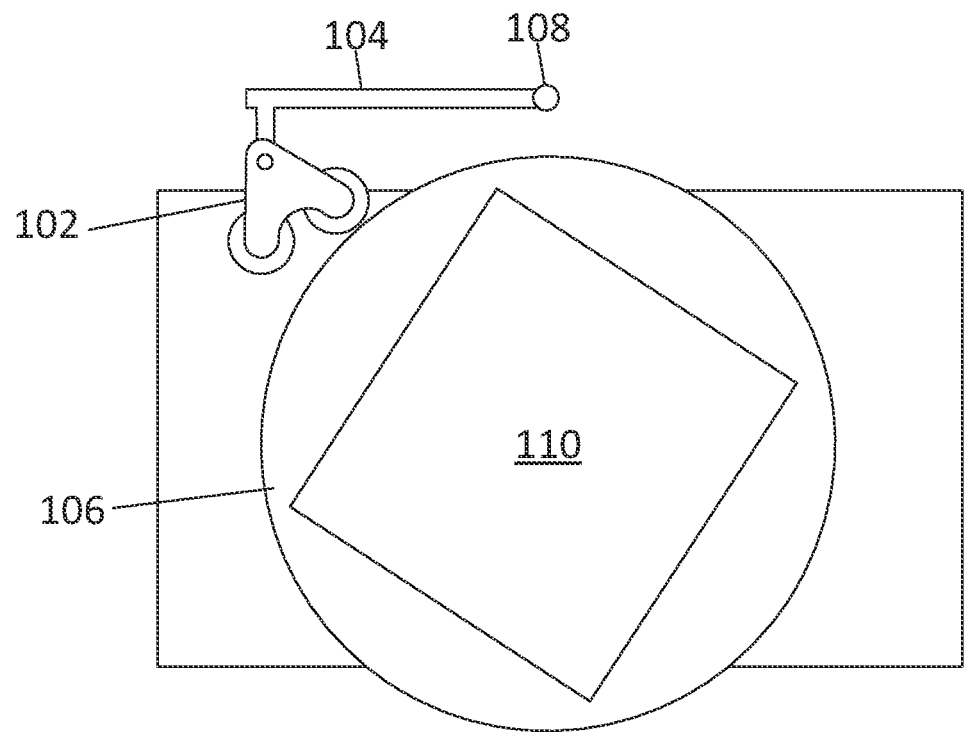
FIGS. 8A-H show a process of forming a seal on a bagged pallet with a heat sealing apparatus according to embodiments of the technology.
Figure 8B:
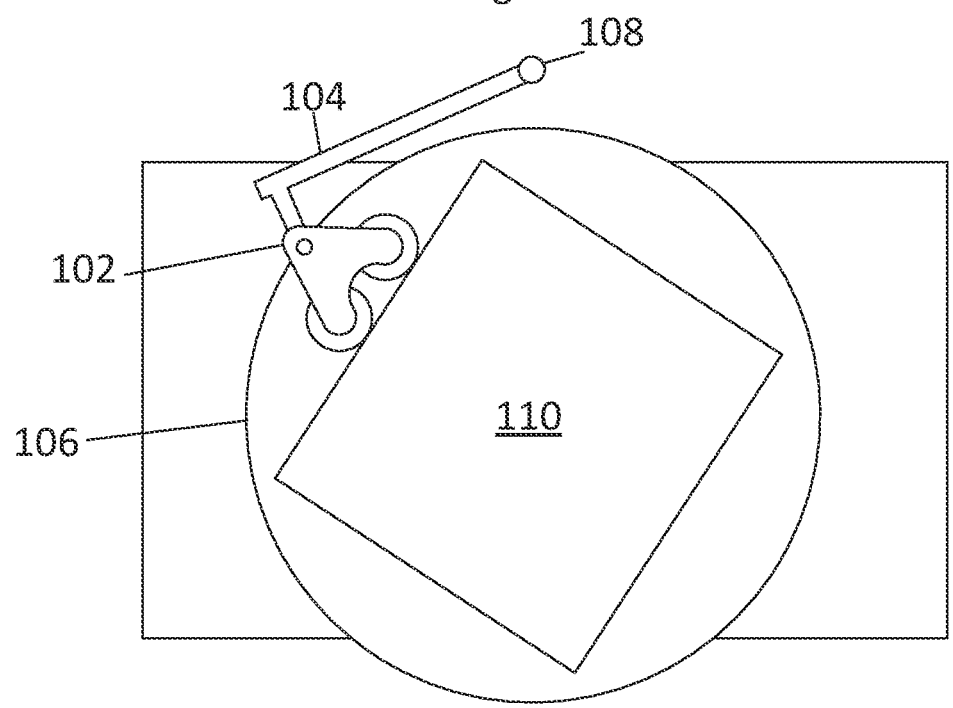
Figure 8C:
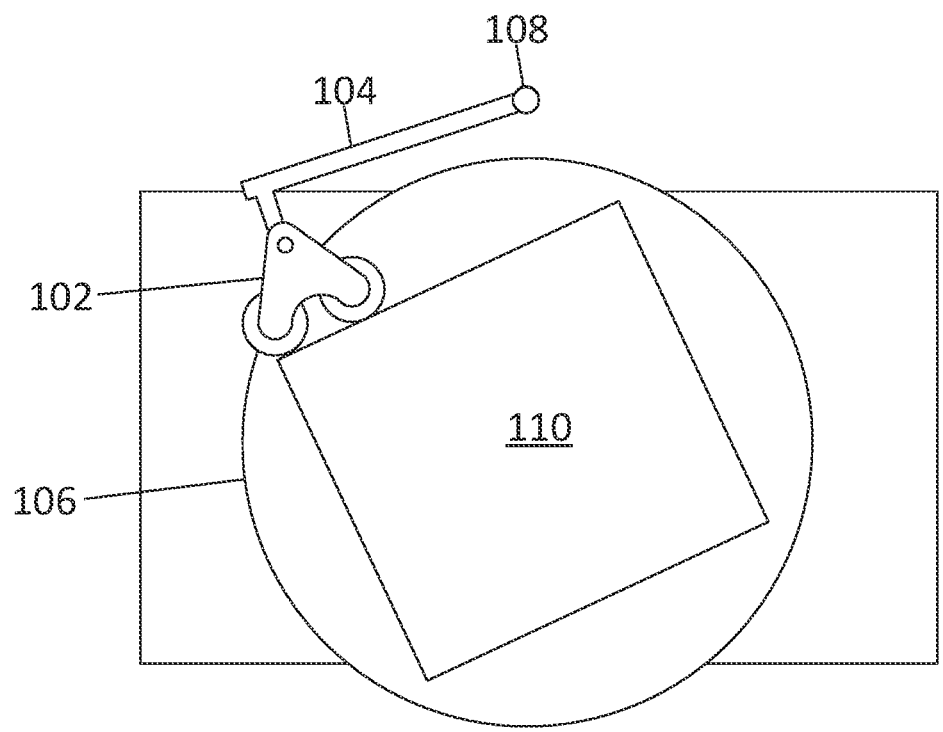

FIGS. 8A-8H show a schematic top views of a heat sealing apparatus forming a seal band on a rotated pallet. Specifically, FIG. 8A shows a pallet with load 110 placed on the center of the turntable 106. From the configuration shown in FIG. 8A, the arm actuator 108 causes the arm 104 to rotate so that the sealing head 102 contacts the overlap of the plastic sheet and plastic bag over the loaded pallet 110. Since the sealing head 102 is freely rotatably coupled to the arm 104 the sealing head 102 rotates so that both heat rollers 208 contact the palletized load 110 as shown in FIG. 8B. From the configuration in FIG. 8B, the turntable 106 is rotated to cause the palletized load 110 to rotate relative to the sealing head 102 as shown in FIG. 8C. The controller 601 controls the angular position and/or the pressure/force/torque of the arm 104 so that the sealing head 102 distance relative to the axis of rotation of the turntable 106 is adjusted in order to maintain contact with the palletized load 110. The controller 601 may be connected to various sensors to determine the position of the sealing head 102, the position of the palletized load 110, the position and/or rotation of the heat rollers 208, the position of the turntable 106, and the position of the arm 104. Examples of the sensors include cameras/computer vision, rotational encoders, laser vision, and magnetic angle sensors. The controller 601 may further be connected to sensors used to determine the force/pressure/torque on the heat rollers 208, arm 104, and/or arm actuator 108, for example strain gauges. The controller 601 may control the rotation of the turntable 106 and the rotation of the arm 104 based on a preset routine based on the size and shape of the palletize load 110. Further, the controller 601 may alter the routine based on sensor feedback, for example from the sensors listed above.

Figure 8D:
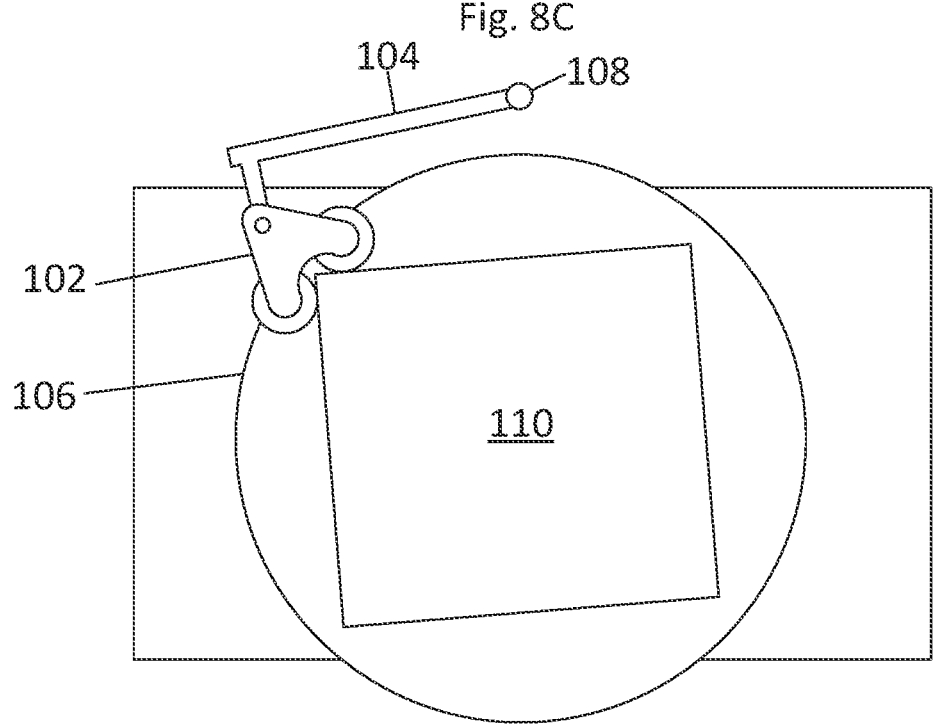
Figure 8E:
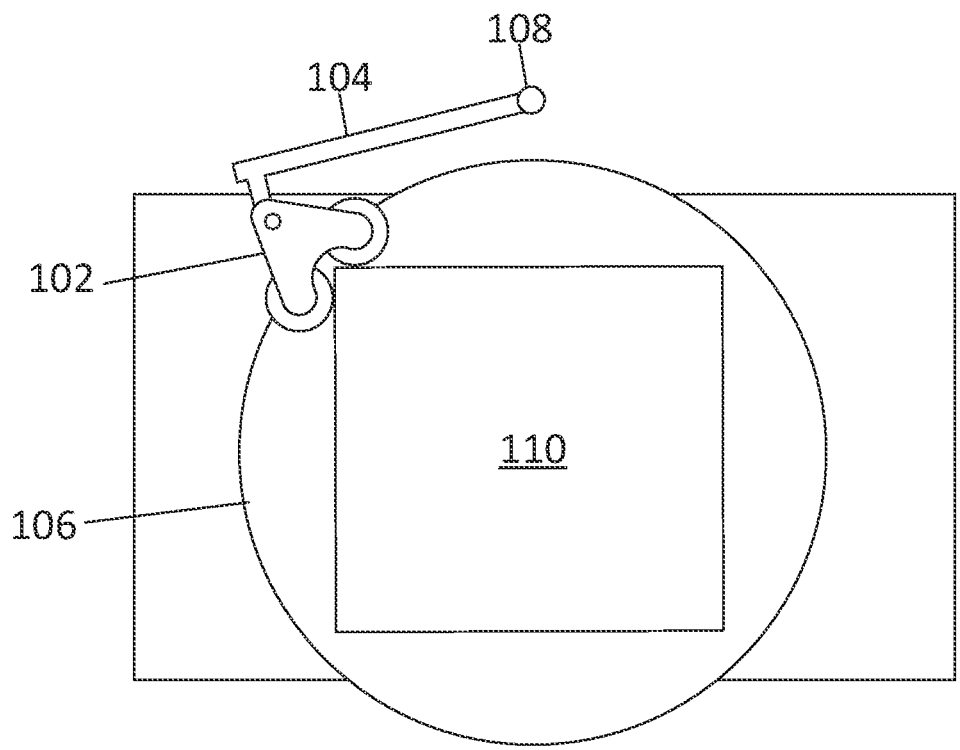
Figure 8F:
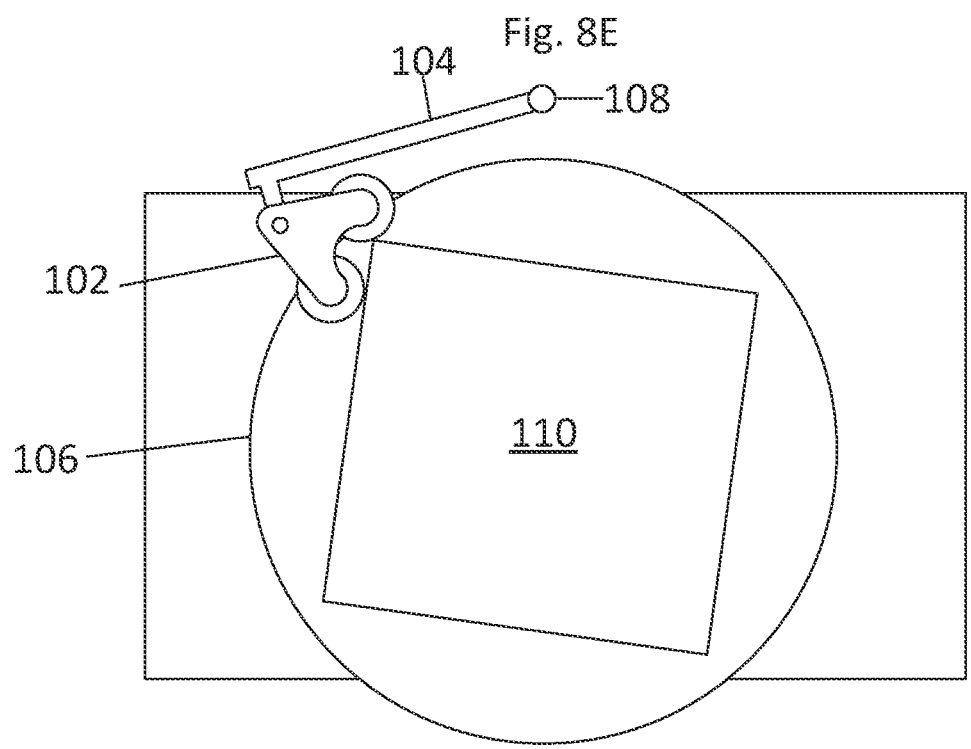
Figure 8G:
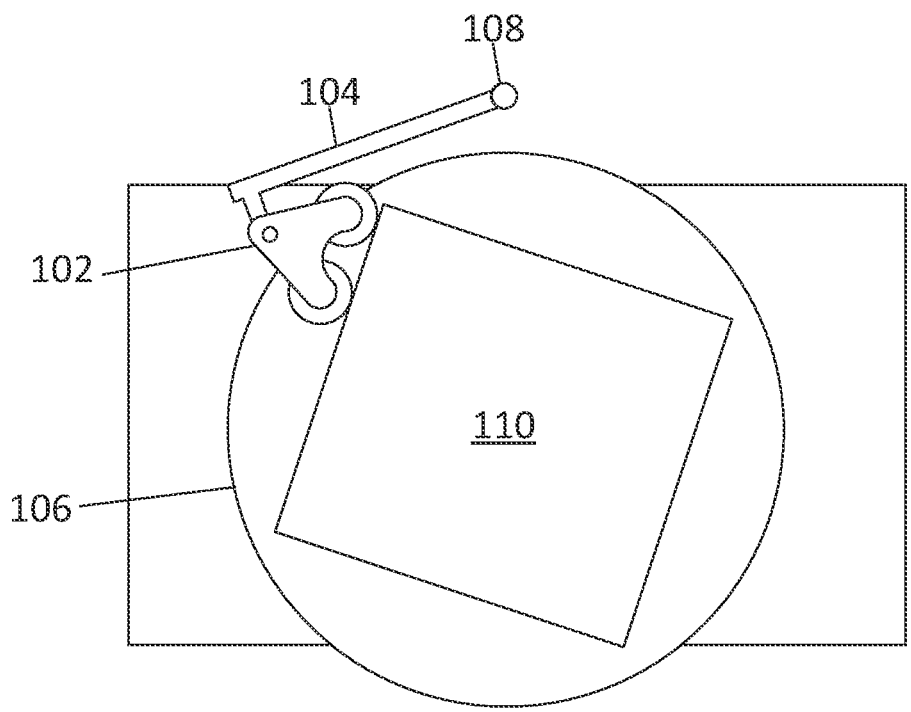
Figure 8H:
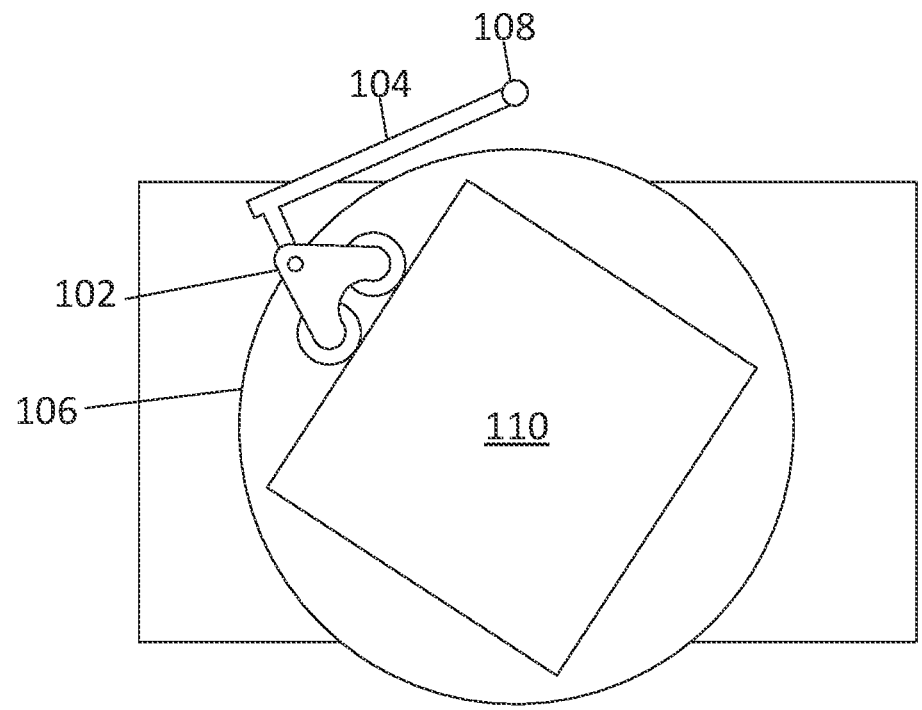

FIGS. 8D-8G show a sequence of the sealing head 102 encountering a corner of the palletized load 110. As shown in FIG. 8D, as the palletized load 110 is rotated by the turntable 106 the leading heat roller 208 rolls over a corner of the palletized load 110 and maintains contact with the palletized load 110 on a second side of the load while the trailing heat roller 208 maintains contact with the first side of the palletized load 110. The freely rotatable connection of the sealing head 102 to the arm 104, the optional airbag, and the routine the controller 601 uses to actuate of the arm actuator system rotating the arm 104 toward the load cause the two heat rollers 208 to both maintain contact with the load 110 as the heat rollers 208 pass the corner as shown in FIGS. 8E and 8F. Once the corner is passed by both heat rollers 208 as shown in FIG. 8G, the turntable 106 continues to rotate to cause both heat rollers 208 to roll along the second side of the load 110 to continue forming a seal band on the overlap area 704 of the plastic bag 703 and plastic sheet 702. From the configuration shown in FIG. 8H the sequence from FIGS. 8B-8G repeats for each side of the load 110 until the seal band is formed along the entire perimeter. The load may be rotated past 360 degrees so that the initial sealed portion is heat sealed a second time. In embodiments, the overlap area 704 on different sides of the load 110 may be heated simultaneously by multiple sealing heads 102. In embodiments, the turntable 106 may be rotated multiple full rotations to form a double seal either over the same roll path, or on a parallel roll path above or below the initial roll path.

During sealing the temperatures of the heated surface of the sealing head, for example the heat rollers 208, and/or the temperature of the seal band may be monitored, for example by temperature sensor within the heat rollers 208, amperage load detectors to the heating elements, and/or thermal cameras, in order for the controller 601 to adjust the temperature of the heating elements 210 or speed of turntable rotation to ensure that the overlap area is not overheated or under heated. In embodiments, the two heat rollers 208 may be maintained at different temperatures. For example, the leading heat roller may be heated to a lower temperature than the trailing heat roller so that the leading roller acts as a pre-heating roller not forming a seal and the trailing rollers acts as a sealing roller to form the seal. In embodiments, the sealing heat roller may be heated to a surface temperature of 400-500 degrees Fahrenheit in order to weld the plastic bag to plastic sheet around 300 degree Fahrenheit.

Figure 13A:
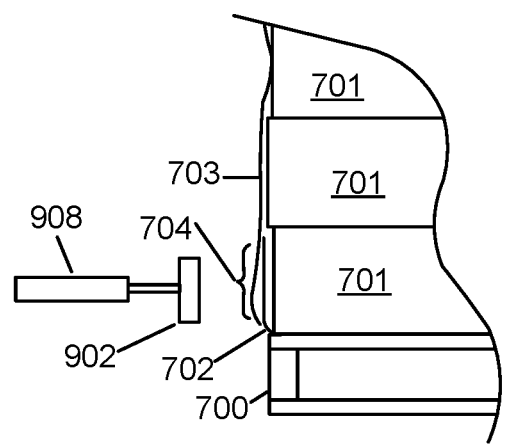
FIGS. 13A and 13B show a sealing process with a heated bar assembly according to embodiments of the technology.
Figure 13B:
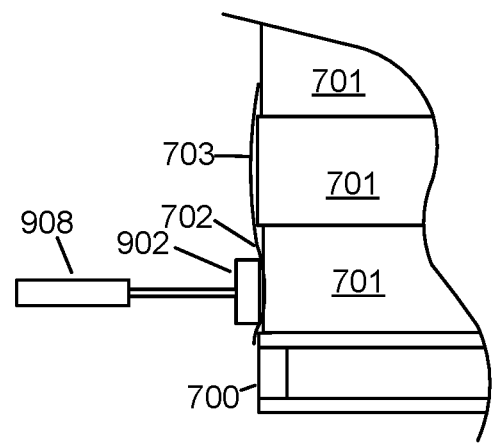

FIGS. 13A and 13B show a plastic bag and plastic sheet overlapping to form an overlap area around the entire perimeter of the palletized load, similar to FIGS. 7A and 7B. FIG. 13A shows a portion of a palletized load of a plurality of containers of perishables 701 on a pallet 700. The plastic sheet 702 under the load is folded up and under the plastic bag 703 to form an overlap area 704. Once overlapped, a heat bar assembly 901 may be used to seal the plastic bag 703 to the plastic sheet 702. For example, as shown in FIG. 13B a heat bar 902 is pressed against the overlap area 704 to causes the overlap area to be pressed between the surface of the underlying container 701 and the heat bar so that the heat from the heat bar welds the plastic sheet 702 to the plastic bag 703 to form an airtight seal band.

Figure 14A:
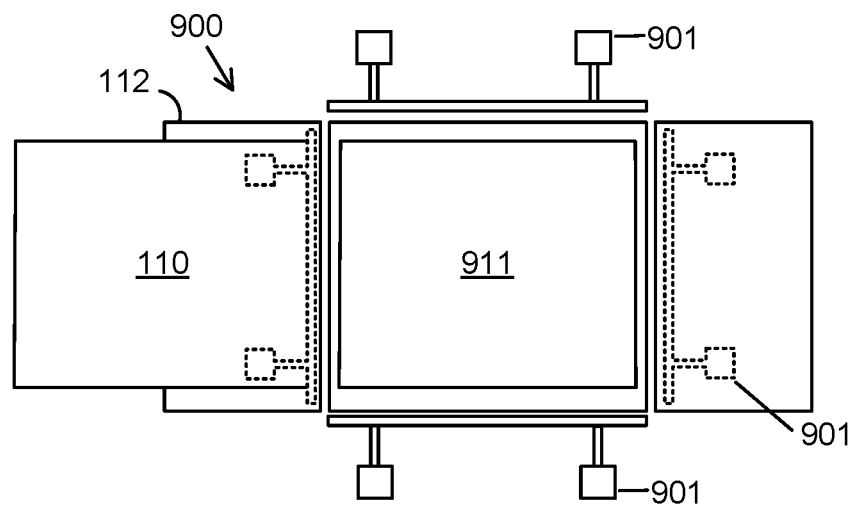
FIGS. 14A-14F show a process of forming a seal on a bagged pallet with a heat sealing apparatus according to embodiments of the technology.
Figure 14B:
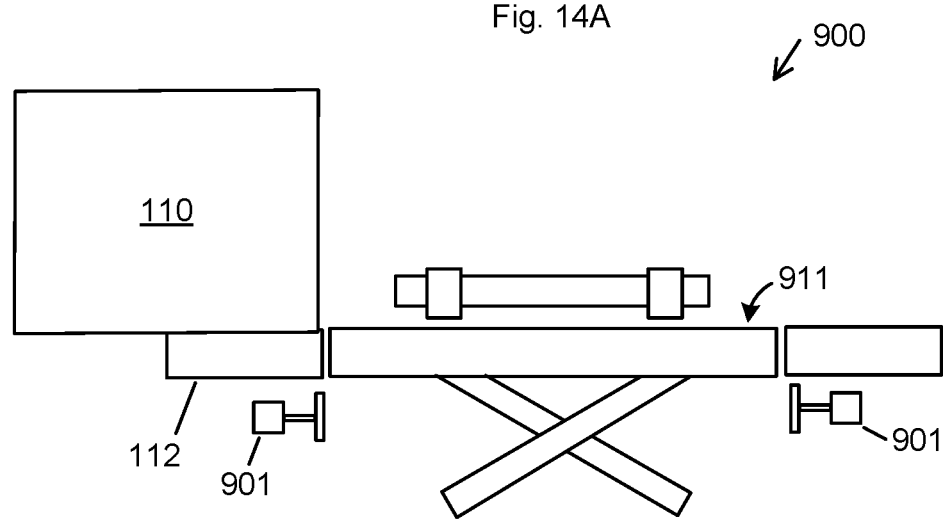
Figure 14C:
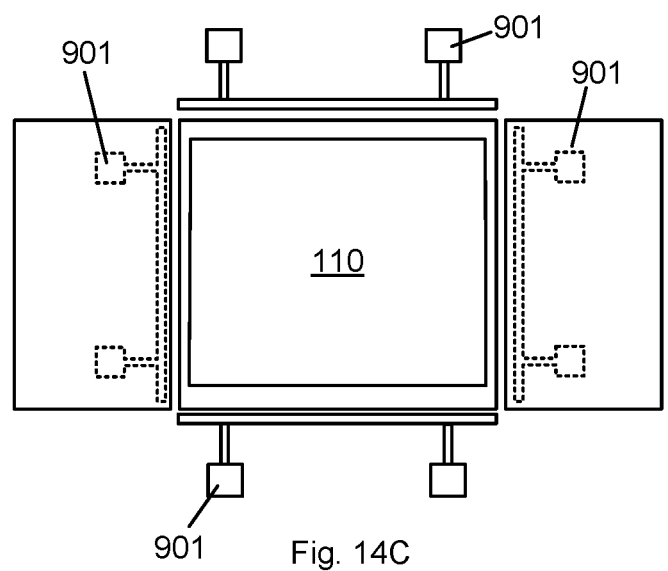

FIGS. 14A-14F show schematic views of a heat sealing apparatus 900 including heat bars forming a seal band on loaded pallet. Specifically, FIGS. 14A and 14B shows a pallet with a load 110 placed on the conveyor 112. From the configuration shown in FIGS. 14A and 14B, the pallet with a load 110 is conveyed onto the pallet receiving surface 911 and centered between the first and second sets of heat bar assemblies 901, as shown in FIG. 14C.

Figure 14D:
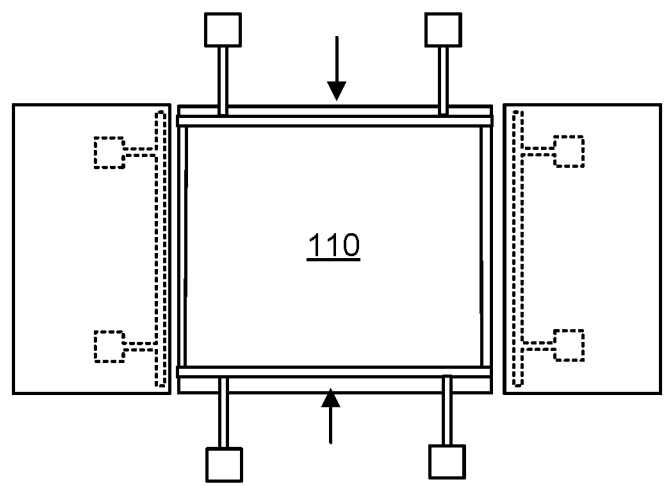
Figure 14E:
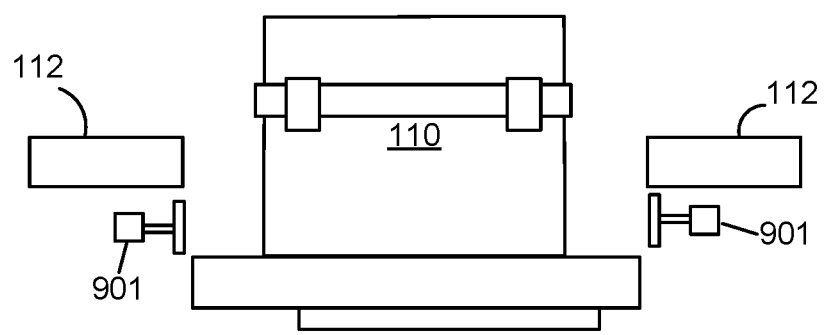
Figure 14F:
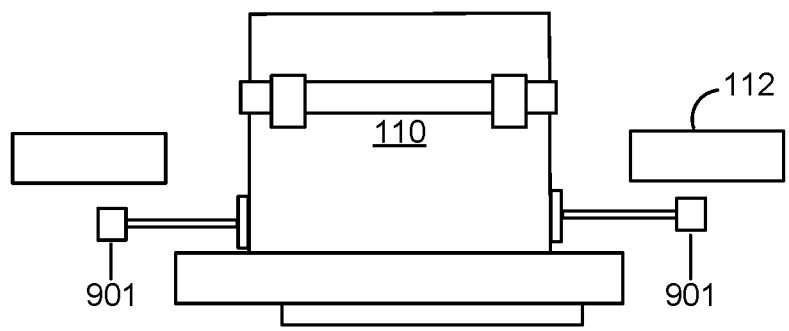

With the conveyor lift 909 in the raised position, the second set of heat bar assemblies 901 may be extended so that a seal portions are formed on opposing sides of the loaded pallet 110, as shown in FIG. 14D. With the conveyor lift 909 in the lowered position, as shown in FIG. 14E, the first set of heat bar assemblies 901, below the conveyor 112, may be extended so that a seal portions are formed on opposing front and rear sides of the loaded pallet 110, as shown in FIG. 14F. In embodiments, the seal portions in the raised position may be formed before or after forming the seal portions in the lowered position.

The controller 601 may be connected to various sensors to determine the position of the heats bars 902, conveyor lift 909, and the position of the palletized load 110 on the pallet receiving surface 911. Examples of the sensors include cameras/computer vision, rotational encoders, laser vision, and magnetic angle sensors. The controller 601 may further be connected to sensors used to determine the force/pressure heat bar assemblies 901, for example strain gauges. The controller 601 may alter the routine based on sensor feedback, for example from the sensors listed above.

During sealing the temperatures of the heated surface of the heat bar may be monitored, for example by temperature sensor within the heat bars, amperage load detectors to the heating elements, and/or thermal cameras, in order for the controller 601 to adjust the temperature of the heating elements 210. In embodiments, the heat bar may be heated to a surface temperature of 400-500 degrees Fahrenheit in order to weld the plastic bag to plastic sheet around 300 degree Fahrenheit.

Modified Atmosphere Station

In embodiments, the palletized bagged load may be conveyed to a modified atmosphere delivery station either before or after the heat seal is formed. Gas delivery nozzles for creating a modified atmosphere environment may be placed inside the bag, for example positioned under each corner of the bag. When activated, these nozzles deliver appropriate quantities of one or more gasses inside the bag to form a desired modified atmosphere. In embodiments, the bag is perforated with a gas injector, and one or more gasses are injected into the bag. The nature and quantity of these gasses may be based upon the height and weight of the palletized perishables, which the system may measure, and upon the nature of the perishables, and may be computed, by a computer or otherwise, for example from a look-up table that uses the weight, height and nature of perishable data to determine the nature and quantity of gases to inject.

After being heat sealed, the modified atmosphere does not leave the bag through the airtight heat seal. This is advantageous compared to previous technologies which included taping the margins, because taped margins are prone to leaking. Accordingly, with heat sealed margins all permeability of the sealed bag is based on the selectable permeability of the bag and does not need to factor in leakage of the seal of the margins. Therefore, with a heat seal the permeability can be tailored to a specific perishable item. To tailor the permeability of the sealed bag, the type and weight of the perishables is be determined. By weighing each pallet, the respiration load of the perishable inside the enclosed bag can be determined. Based on this data, a system for punching or cutting calibrated holes in the pallet bag, forms one or more appropriate openings in the bag, and/or an appropriate hole such that a breathing membrane or label may be placed over such a hole. The size of hole and type of label varies with the type/variety and weight of the perishables item, and with the gas permeability of the bag. The breathing labels and/or calibrated holes help to maintain a desired controlled or modified atmosphere inside a bag, by balancing the desired components, e.g., carbon dioxide and oxygen, with the film permeability and perishable respiration load.

Offload Station

After the palletized load is bag, sealed, and gasified with a modified atmosphere, the conveyor system may convey the palletized load to an offload station for delivery elsewhere.

The various aspects, embodiments, implementations or features of the described embodiments can be used separately or in any combination. In particular, it should be appreciated that the various elements of concepts from FIG. 1A-8H may be combined without departing from the spirit or scope of the invention.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, or gradients thereof, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained.

Preferred embodiments of this invention are described herein, including the best mode known to the inventors for carrying out the invention. The invention is susceptible to various modifications and alternative constructions, and certain shown exemplary embodiments thereof are shown in the drawings and have been described above in detail. Variations of those preferred embodiments, within the spirit of the present invention, may become apparent to those of ordinary skill in the art upon reading the foregoing description. The inventors expect skilled artisans to employ such variations as appropriate, and the inventors intend for the invention to be practiced otherwise than as specifically described herein. Accordingly, it should be understood that there is no intention to limit the invention to the specific form or forms disclosed, but on the contrary, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context. The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

The invention claimed is:

1. A method for sealing containers of perishables on a pallet between a plastic sheet and a plastic bag, wherein the plastic bag is positioned over the containers, wherein the plastic sheet is positioned between the containers and the pallet with margins of the plastic sheet folded to overlap margins of the plastic bag in an overlap area, the method comprising:
applying one or more heated sealing heads to the overlap area in order to transfer heat to the plastic sheet and the plastic bag in the overlap area to weld the plastic sheet to the plastic bag around an entire perimeter of the pallet, wherein the one or more heated sealing head comprises a plurality of heated bar assemblies, wherein the plurality of heated bar assemblies comprise a first set of two heated bar assemblies and a second set of two heated bar assemblies; and
transferring, via a conveyor, the pallet to a pallet receiving surface, wherein the first set of heated bar assemblies is positioned above the conveyor and the second set of heated bar assemblies is located below the conveyor,
forming a left seal and a right seal by welding the plastic sheet to the plastic bag on left and right sides of the pallet with the first set of heated bar assemblies, and
forming a front seal and a rear seal by welding the plastic sheet to the plastic bag on front and rear sides of the pallet with the second set of heated bar assemblies in order to form a heat seal around the entire perimeter of the pallet.

2. The method of claim 1, wherein each heated bar assembly comprises a heated bar and one or more actuators,
wherein applying the one or more heated sealing head comprises positioning, with the one or more actuators, each heated bar to be in contact with the overlap area in order to transfer heat to the plastic sheet and the plastic bag in the overlap area to weld the plastic sheet to the plastic bag around the entire perimeter of the pallet.

3. The method of claim 1, wherein the first set of heated bar assemblies are positioned at a height above the second set of heated bar assemblies.

4. The method of claim 1, further comprising:
raising or lowering, via a conveyor lift, the pallet between a raised position for using the first set of heated bar assemblies to form a seal and a lowered position for using the second set of heated bar assemblies to form a seal.

5. The method of claim 4, wherein the conveyor lift includes a scissor lift.

6. The method of claim 2, wherein the heated bar comprises a flat rectangular outer surface that contacts the overlap area to weld the plastic bag to the plastic sheet.

7. The method of claim 2, wherein the heated bar comprises a curved shaped outer surface that contacts the overlap area to weld the plastic bag to the plastic sheet.

8. The method of claim 2, wherein the heated bar comprises a grooved outer surface that contacts the overlap area to weld the plastic bag to the plastic sheet.

9. The method of claim 8, wherein the grooved outer surface creates a plurality of seal bands.

10. A sealing head for sealing containers of perishables on a pallet between a plastic sheet and a plastic bag, the sealing head comprising:
a plurality of heated bar assemblies to transfer heat to the plastic sheet and the plastic bag in an overlap area to weld the plastic sheet to the plastic bag around an entire perimeter of a pallet, wherein the plurality of heated bar assemblies comprise a first set of two heated bar assemblies and a second set of two heated bar assemblies,
wherein each heated bar assembly comprises a heated bar and one or more actuators,
wherein the one or more actuators are configured to position each heated bar to be in contact with the overlap area,
wherein the first set of heated bar assemblies is positioned above a conveyor and the second set of heated bar assemblies is located below the conveyor, wherein the first set of heated bar assemblies are configured to form a left seal and a right seal, and the second set of heated bar assemblies are configured to form a front seal and a rear seal in order to form a heat seal around the entire perimeter of the pallet.

11. The sealing head of claim 10, wherein the first set of heated bar assemblies are positioned at a height above the second set of heated bar assemblies.

12. The sealing head of claim 10, wherein the heated bar comprises a flat rectangular outer surface that contacts the overlap area to weld the plastic bag to the plastic sheet.

13. A heat sealing system for sealing containers of perishables on a pallet between a plastic sheet and a plastic bag, wherein the plastic bag is positioned over the containers, wherein the plastic sheet is positioned between the containers and the pallet with margins of the plastic sheet folded to overlap margins of the plastic bag in an overlap area, the system comprising:
a conveyor system for transferring the pallet to a pallet receiving surface;
a conveyor lift for raising and lowering the pallet between a raised position and a lowered position; and
a plurality of heated bar assemblies to transfer heat to the plastic sheet and the plastic bag in the overlap area to weld the plastic sheet to the plastic bag around an entire perimeter of a pallet, the plurality of heated bar assemblies comprising a first set of heated bar assemblies positioned above the conveyor system and a second set of heated bar assemblies positioned below the conveyor, wherein the first set of heated bar assemblies are configured to form a left seal and a right seal, and the second set of heated bar assemblies are configured to form a front seal and a rear seal in order to form a heat seal around the entire perimeter of the pallet,
wherein each heated bar assembly comprises a heated bar and one or more actuators, and
wherein the one or more actuators are configured to position each heated bar to be in contact with the overlap area to weld the plastic sheet to the plastic bag around the entire perimeter of a pallet.

14. The system of claim 13, wherein the first set of heated bar assemblies are positioned at a height above the second set of heated bar assemblies.

15. The system of claim 14, wherein
the conveyor lift is configured to raise or lower the pallet between the raised position for using the first set of heated bar assemblies to form a seal and the lowered position for using the second set of heated bar assemblies to form a seal.

* * * * *